US011892780B1

(12) United States Patent
Yamada et al.

(10) Patent No.: US 11,892,780 B1
(45) Date of Patent: Feb. 6, 2024

(54) IMAGE FORMING APPARATUS AND PROCESS CARTRIDGE

(71) Applicant: FUJIFILM Business Innovation Corp., Tokyo (JP)

(72) Inventors: Yoshiteru Yamada, Kanagawa (JP); Tomoya Sasaki, Kanagawa (JP); Ryosuke Fujii, Kanagawa (JP); Hiroko Kobayashi, Kanagawa (JP); Yuto Okazaki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/155,032

(22) Filed: Jan. 16, 2023

(30) Foreign Application Priority Data

Aug. 17, 2022 (JP) ................................ 2022-130230

(51) Int. Cl.
*G03G 5/05* (2006.01)
*G03G 15/00* (2006.01)
(Continued)

(52) U.S. Cl.
CPC ....... *G03G 15/0233* (2013.01); *G03G 5/0567* (2013.01); *G03G 5/0605* (2013.01);
(Continued)

(58) Field of Classification Search
CPC ............... G03G 5/0567; G03G 5/0605; G03G 5/061473; G03G 15/0233; G03G 15/0806;
(Continued)

(56) References Cited

U.S. PATENT DOCUMENTS 10,539,888 B2 1/2020 Kaku et al.
11,106,147 B2 8/2021 Kudoh
(Continued)

FOREIGN PATENT DOCUMENTS

EP 1744227 A1 * 1/2007 ......... G03G 21/0011
JP 2008233120 10/2008
(Continued)

*Primary Examiner* — Sophia S Chen
(74) *Attorney, Agent, or Firm* — JCIPRNET

(57) ABSTRACT

An image forming apparatus includes an electrophotographic photoreceptor that has a photosensitive layer constituting a surface of the electrophotographic photoreceptor, a charging device that charges the surface of the electrophotographic photoreceptor, an electrostatic charge image forming device that forms an electrostatic charge image on the charged surface of the electrophotographic photoreceptor, a developing device that accommodates a developer containing a toner which contains toner particles and an external additive, and develops the electrostatic charge image formed on the surface of the electrophotographic photoreceptor by the developer as a toner image, a transfer device that transfers the toner image formed on the surface of the electrophotographic photoreceptor to a surface of a recording medium, and a cleaning device that includes a cleaning blade coming into contact with the surface of the electrophotographic photoreceptor and cleaning at least residual toner particles on the surface of the electrophotographic photoreceptor.

9 Claims, 4 Drawing Sheets

(51) Int. Cl.

| | |
|---|---|
| ***G03G 21/00*** | (2006.01) |
| ***G03G 15/02*** | (2006.01) |
| ***G03G 15/08*** | (2006.01) |
| ***G03G 5/06*** | (2006.01) |

(52) U.S. Cl.
CPC ... *G03G 5/061473* (2020.05); *G03G 15/0806* (2013.01); *G03G 15/752* (2013.01); *G03G 21/0011* (2013.01); *G03G 2215/00518* (2013.01)

(58) Field of Classification Search
CPC .... G03G 15/75; G03G 15/751; G03G 15/752; G03G 21/0011; G03G 2215/00518
See application file for complete search history.

(56) References Cited

U.S. PATENT DOCUMENTS

| | | | | |
|---|---|---|---|---|
| 2010/0172670 | A1* | 7/2010 | Ohshima .............. | G03G 15/751 430/58.75 |
| 2017/0242350 | A1* | 8/2017 | Sugiyama .............. | G03G 15/75 |
| 2018/0113409 | A1* | 4/2018 | Kinai ................... | G03G 15/553 |
| 2019/0094730 | A1* | 3/2019 | Kamisaki ............... | G03G 5/072 |

FOREIGN PATENT DOCUMENTS

| | | |
|---|---|---|
| JP | 2013097300 | 5/2013 |
| JP | 2019012141 | 1/2019 |
| JP | 2019035900 | 3/2019 |
| JP | 2021015223 | 2/2021 |
| JP | 2021071565 | 5/2021 |
| JP | 2021117377 | 8/2021 |

* cited by examiner

IMAGE FORMING APPARATUS AND PROCESS CARTRIDGE

CROSS-REFERENCE TO RELATED APPLICATIONS

This application is based on and claims priority under 35 USC 119 from Japanese Patent Application No. 2022-130230 filed Aug. 17, 2022.

BACKGROUND

(i) Technical Field

The present invention relates to an image forming apparatus and a process cartridge.

(ii) Related Art

JP2008-233120A discloses a cleaning unit provided in an electrophotographic image forming apparatus and is used for removing a toner on a surface of a photoreceptor, in which a cleaning blade includes a blade main body consisting of a strip-like elastic body including a wedge-like portion and a base portion bonded to a back side of the wedge-like portion, an rebound resilience coefficient of the wedge-like portion is less than an rebound resilience coefficient of the base portion, and a wedge tip of the wedge-like portion serves as a blade contact side that comes into contact with the surface of the photoreceptor.

SUMMARY

Aspects of non-limiting embodiments of the present disclosure relate to an image forming apparatus that includes an electrophotographic photoreceptor having a photosensitive layer that constitutes a surface thereof and a cleaning device having a cleaning blade that comes into contact with the surface of the electrophotographic photoreceptor and cleans at least residual toner particles on the surface of the electrophotographic photoreceptor, and abrasion of the electrophotographic photoreceptor can be suppressed and external additive filming can be reduced as compared with a case where the photosensitive layer contains only a polycarbonate resin as a binder resin or an angle θ between a tangent line at a contact point between the cleaning blade and residual toner particles and a tangent line at a contact point between the residual toner particles and the surface of the electrophotographic photoreceptor is less than 350 or greater than 50°.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

Specific means for achieving the above-described object includes the following aspects.

According to an aspect of the present disclosure, there is provided an image forming apparatus including: an electrophotographic photoreceptor that has a photosensitive layer constituting a surface of the electrophotographic photoreceptor; a charging device that charges the surface of the electrophotographic photoreceptor; an electrostatic charge image forming device that forms an electrostatic charge image on the charged surface of the electrophotographic photoreceptor; a developing device that accommodates a developer containing a toner which contains toner particles and an external additive, and develops the electrostatic charge image formed on the surface of the electrophotographic photoreceptor by the developer as a toner image; a transfer device that transfers the toner image formed on the surface of the electrophotographic photoreceptor to a surface of a recording medium; and a cleaning device that includes a cleaning blade coming into contact with the surface of the electrophotographic photoreceptor and cleaning at least residual toner particles on the surface of the electrophotographic photoreceptor, in which the photosensitive layer of the electrophotographic photoreceptor contains a polyester resin (1) having a dicarboxylic acid unit (A) represented by Formula (A) and a diol unit (B) represented by Formula (B), and an angle θ between a tangent line at a contact point between the cleaning blade and the residual toner particles and a tangent line at a contact point between the residual toner particles and the surface of the electrophotographic photoreceptor is 35° or greater and 50° or less.

Formula (A)

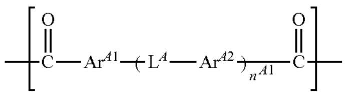

Formula (B)

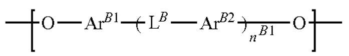

In Formula (A), $Ar^{A1}$ and $Ar^{A2}$ each independently represent an aromatic ring that may have a substituent, $L^A$ represents a single bond or a divalent linking group, and $n^{A1}$ represents 0, 1, or 2.

In Formula (B), $Ar^{B1}$ and $Ar^{B2}$ each independently represent an aromatic ring that may have a substituent, $L^B$ represents a single bond, an oxygen atom, a sulfur atom, or —$C(Rb^1)(Rb^2)$—, and $n^{B1}$ represents 0, 1, or 2. $Rb^1$ and $Rb^2$ each independently represent a hydrogen atom, an alkyl group having 1 or more and 20 or less carbon atoms, an aryl group having 6 or more and 12 or less carbon atoms, or an aralkyl group having 7 or more and 20 or less carbon atoms, and $Rb^1$ and $Rb^2$ may be bonded to each other to form a cyclic alkyl group.

BRIEF DESCRIPTION OF THE DRAWINGS

Exemplary embodiment(s) of the present invention will be described in detail based on the following figures, wherein.

DETAILED DESCRIPTION

Figure 1:
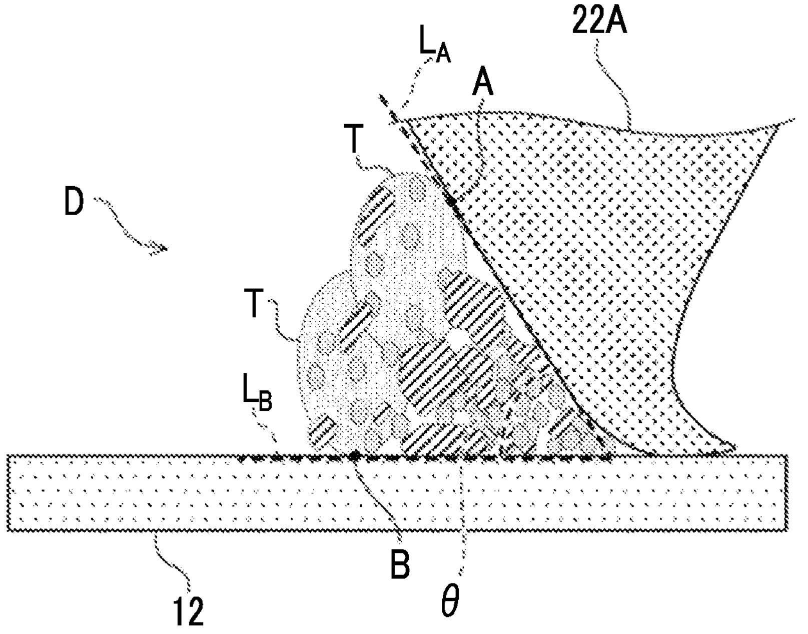
FIG. 1 is a schematic view for describing a method of measuring an angle θ in the present exemplary embodiment.

Hereinafter, exemplary embodiments of the present disclosure will be described. The following descriptions and examples merely illustrate the exemplary embodiments, and do not limit the scope of the exemplary embodiments.

In the present disclosure, a numerical range shown using “to” indicates a range including numerical values described before and after “to” as a minimum value and a maximum value.

In a numerical range described in a stepwise manner in the present disclosure, an upper limit value or a lower limit value described in a certain numerical range may be replaced with an upper limit value or a lower limit value in another numerical range described in a stepwise manner. Further, in a numerical range described in the present disclosure, an upper limit value or a lower limit value described in the numerical range may be replaced with a value shown in Examples.

In the present disclosure, the meaning of the term “step” includes not only an independent step but also a step whose intended purpose is achieved even in a case where the step is not clearly distinguished from other steps.

In the present disclosure, in a case where an exemplary embodiment is described with reference to drawings, the configuration of the exemplary embodiment is not limited to the configuration shown in the drawings. In addition, the sizes of members in each drawing are conceptual and do not limit the relative relationship between the sizes of the members.

In the present disclosure, each component may include a plurality of kinds of substances corresponding to each component. In the present disclosure, in a case where a plurality of kinds of substances corresponding to each component in a composition are present, the amount of each component in the composition indicates the total amount of the plurality of kinds of substances present in the composition unless otherwise specified.

In the present disclosure, each component may include a plurality of kinds of particles corresponding to each component. In a case where a plurality of kinds of particles corresponding to each component are present in a composition, the particle diameter of each component indicates the value of a mixture of the plurality of kinds of particles present in the composition, unless otherwise specified.

In the present disclosure, the term “(meth)acryl” may denote any of “acryl” or “methacryl”.

In the present disclosure, an alkyl group may be any of linear, branched, or cyclic unless otherwise specified.

Image Forming Apparatus

An image forming apparatus according to the present exemplary embodiment is an image forming apparatus including an electrophotographic photoreceptor that has a photosensitive layer constituting a surface thereof, a charging device that charges the surface of the electrophotographic photoreceptor, an electrostatic charge image forming device that forms an electrostatic charge image on the charged surface of the electrophotographic photoreceptor, a developing device that accommodates a developer containing a toner, which contains toner particles and an external additive, and develops the electrostatic charge image formed on the surface of the electrophotographic photoreceptor by the developer as a toner image, a transfer device that transfers the toner image formed on the surface of the electrophotographic photoreceptor to a surface of a recording medium, and a cleaning device that includes a cleaning blade coming into contact with the surface of the electrophotographic photoreceptor and cleaning at least residual toner particles on the surface of the electrophotographic photoreceptor, in which the photosensitive layer of the electrophotographic photoreceptor contains a polyester resin (1) having a dicarboxylic acid unit (A) represented by Formula (A) and a diol unit (B) represented by Formula (B), and an angle θ between a tangent line at a contact point between the cleaning blade and the residual toner particles and a tangent line at a contact point between the residual toner particles and the surface of the electrophotographic photoreceptor is 35° or greater and 50° or less.

Hereinafter, the electrophotographic photoreceptor will also be simply referred to as “photoreceptor”, and the polyester resin (1) having a dicarboxylic acid unit (A) represented by Formula (A) and a diol unit (B) represented by Formula (B) will also be simply referred to as “polyester resin (1)”.

Since the surfaces of the toner particles are softened in a high-temperature and high-humidity environment (for example, 30° C. and 85% RH), the external additive is likely to be embedded in the toner particles, and the amount of the external additive to be released from the toner particles is likely to be reduced. Under the above-described circumstances, the amount of the external additive to be supplied to the contact portion between the cleaning blade and the photoreceptor is reduced in a case where the residual toner remaining on the surface of the photoreceptor is cleaned, the lubricity is insufficient due to the external additive, and thus the friction of the contact portion between the cleaning blade and the photoreceptor increases. The behavior of the tip of the cleaning blade is unstabilized due to the influence of the friction, and thus a phenomenon in which the external additive adheres to the surface of the photoreceptor, that is, external additive filming occurs due to the insufficient force to remove the external additive.

Further, it is found that the abrasion resistance of the photoreceptor is obtained without using fluororesin particles by using the above-described polyester resin (1) for the photosensitive layer constituting the surface of the photoreceptor. Meanwhile, since the surface of the photosensitive layer containing the polyester resin (1) does not contain fluororesin particles, the photosensitive layer has a property of having a large friction coefficient. Therefore, the behavior of the tip of the cleaning blade is further unstabilized in a case where the surface of the photoreceptor having such a photosensitive layer is cleaned, and thus the external additive filming is more likely to occur.

Further, a method of stabilizing the behavior of the tip of the cleaning blade by adjusting the contact conditions (for example, a pressing force NF, a contact angle WA, and the like) between the surface of the photoreceptor and the cleaning blade may also be used, but abrasion of the photoreceptor may occur in a case of employing this method.

The present inventors conducted research on an image forming apparatus including a photoreceptor that contains a polyester resin (1) in a photosensitive layer constituting a surface thereof and a cleaning device that includes a cleaning blade coming into contact with the surface of the photoreceptor and cleaning at least residual toner particles on the surface of the photoreceptor, and found that abrasion of the photoreceptor can be suppressed and external additive filming can be suppressed by satisfying the following conditions.

That is, it is found that the external additive filming can be suppressed while the abrasion of the photoreceptor is suppressed by setting an angle θ between a tangent line at a contact point between the cleaning blade and the residual toner particles and a tangent line at a contact point between the residual toner particles and the surface of the photoreceptor to 35° or greater and 50° or less in a case where the surface of the photoreceptor containing the polyester resin (1) in the photosensitive layer constituting the surface is brought into contact with the cleaning blade for cleaning.

Angle θ

The term "angle θ" in the image forming apparatus according to the present exemplary embodiment will be described.

The angle θ is 35θ or greater and 50° or less as described above and for example, preferably 40θ or greater and 50° or less from the viewpoint of further suppressing the external additive filming.

The angle θ is measured in the following manner.

First, 12,500 sheets of images having an image density of 1% are output on A4 paper in a high-temperature and high-humidity environment (30° C. and 85%) using an image forming apparatus serving as a measurement target. The photoreceptor and the cleaning blade are removed from the image forming apparatus after the output so that the residue of the external additive remaining in the contact portion between the photoreceptor and the cleaning blade, that is, a so-called external dam does not collapse. FIG. 1 is a schematic view showing the photoreceptor and the cleaning blade that have been taken out as viewed from a side surface. In FIG. 1, the angle θ between a tangent line $L_A$ at a contact point between a cleaning blade 22A and residual toner particles T in an external dam D and a tangent line $L_B$ at a contact point B between the residual toner particles T and the surface of the photoreceptor 12 is measured with a laser microscope VK-9500 (manufactured by Keyence Corporation). Further, in a case where a coating film formed of a lubricant is formed on the surface of the photoreceptor 12, the contact point B is defined as a contact point between the residual toner particle T and the surface of the coating film of the lubricant on the surface of the photoreceptor 12. Further, it is desirable to select, for example, a contact point separated from the surface of the photoreceptor 12 (or the surface of the coating film of a lubricant) by a vertical distance of 5 μm as the contact point A between the cleaning blade 22A and the residual toner particle T in an external dam D.

The angle θ can be adjusted by the physical properties of the cleaning blade and the contact conditions between the surface of the photoreceptor and the cleaning blade.

Examples of the physical properties of the cleaning blade for adjusting the angle θ include the surface free energy at the contact portion between the residual toner particle and the surface of the photoreceptor, the 100% modulus at the contact portion between the residual toner particle and the surface of the photoreceptor, and the rebound resilience coefficient of the contact portion between the residual toner particle and the surface of the photoreceptor.

Hereinafter, the configurations of the image forming apparatus according to the present exemplary embodiment will be described.

The image forming apparatus according to the present exemplary embodiment includes an electrophotographic photoreceptor that has a photosensitive layer constituting a surface thereof, a charging device that charges the surface of the electrophotographic photoreceptor, an electrostatic charge image forming device that forms an electrostatic charge image on the charged surface of the electrophotographic photoreceptor, a developing device that accommodates a developer containing a toner, which contains toner particles and an external additive, and develops the electrostatic charge image formed on the surface of the electrophotographic photoreceptor by the developer as a toner image, a transfer device that transfers the toner image formed on the surface of the electrophotographic photoreceptor to a surface of a recording medium, and a cleaning device that includes a cleaning blade coming into contact with the surface of the electrophotographic photoreceptor and cleaning at least residual toner particles on the surface of the electrophotographic photoreceptor.

Further, the image forming apparatus may further include a fixing device that fixes the toner image transferred to the surface of the recording medium.

Here, as the image forming apparatus according to the present exemplary embodiment, a known image forming apparatus such as an apparatus including a direct transfer type apparatus that transfers the toner image formed on the surface of the photoreceptor directly to the recording medium, an intermediate transfer type apparatus that primarily transfers the toner image formed on the surface of the photoreceptor to the surface of the intermediate transfer member and secondarily transfers the toner image transferred to the surface of the intermediate transfer member to the surface of the recording medium, and an apparatus including a destaticizing device that irradiates the surface of the photoreceptor with destaticizing light after the transfer of the toner image and before the charging to destaticize the surface.

In a case of the intermediate transfer type device, the transfer device is, for example, configured to include an intermediate transfer member having a surface onto which the toner image is transferred, a primary transfer device primarily transferring the toner image formed on the surface of the photoreceptor to the surface of the intermediate transfer member, and a secondary transfer device secondarily transferring the toner image transferred to the surface of the intermediate transfer member to the surface of the recording medium.

In the image forming apparatus according to the present exemplary embodiment, the portion including at least the photoreceptor may constitute a unit for an image forming apparatus and may have a cartridge structure (process cartridge) that is attachable to and detachable from the image forming apparatus.

Here, a process cartridge according to the present exemplary embodiment is a process cartridge including an electrophotographic photoreceptor that has a photosensitive layer constituting a surface thereof and a cleaning device that has a cleaning blade coming into contact with the surface of the electrophotographic photoreceptor and cleaning at least residual toner particles on the surface of the electrophotographic photoreceptor, in which the photosensitive layer of the electrophotographic photoreceptor contains a polyester resin (1) having a dicarboxylic acid unit (A) represented by Formula (A) and a diol unit (B) represented by Formula (B), and an angle θ between a tangent line at a contact point between the cleaning blade and the residual toner particles and a tangent line at a contact point between the residual toner particles and the surface of the electrophotographic photoreceptor is 35° or greater and 50° or less.

Further, the process cartridge according to the present exemplary embodiment is not limited to the above-described configuration including the electrophotographic photoreceptor and the cleaning device, and the process cartridge may have, for example, a configuration including at least one selected from other units such as a charging device, an electrostatic charge image forming device, a developing device, and a transfer device, as necessary.

Hereinafter, an example of the image forming apparatus according to the present exemplary embodiment will be described, but the present exemplary embodiment is not limited thereto. Further, main parts shown in the figures will be described, but description of other parts will not be provided.

Figure 2:
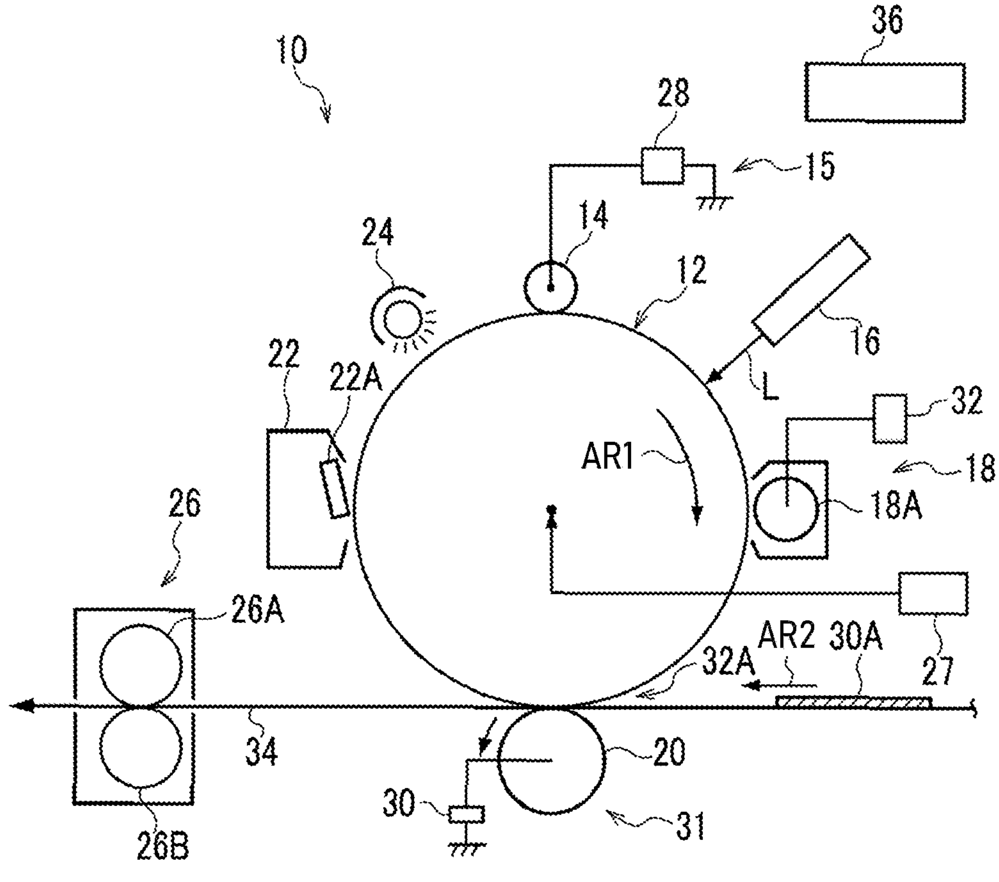
FIG. 2 is a schematic configuration view showing an example of an image forming apparatus according to the present exemplary embodiment.

FIG. 2 is a schematic configuration view showing an example of the image forming apparatus according to the present exemplary embodiment.

An image forming apparatus 10 according to the present exemplary embodiment includes the photoreceptor 12 as shown in FIG. 2. The photoreceptor 12 has a columnar shape, is connected to a driving unit 27 such as a motor via a drive force transmission member (not shown) such as a gear, and is rotationally driven by the driving unit 27 around a rotation axis indicated by a black spot. In the example shown in FIG. 2, the photoreceptor 12 is rotationally driven in a direction indicated by an arrow AR1.

For example, a charging device 15, an electrostatic charge image forming device 16, a developing device 18, a transfer device 31, a cleaning device 22, and a destaticizing device 24 are provided in the vicinity of the photoreceptor 12 in order in a rotation direction of the photoreceptor 12. Further, the image forming apparatus 10 is also provided with a fixing device 26 including a fixing member 26A and a pressure member 26B disposed in contact with the fixing member 26A. Further, the image forming apparatus 10 includes a control device 36 that controls the operation of each device (each unit). Further, a unit including the photoreceptor 12, the charging device 15, the electrostatic charge image forming device 16, the developing device 18, the transfer device 31, and the cleaning device 22 corresponds to an image forming unit.

In the image forming apparatus 10, at least the photoreceptor 12 and the cleaning device 22 may be provided as process cartridges.

Electrophotographic Photoreceptor (Photoreceptor)

The photoreceptor in the image forming apparatus according to the present exemplary embodiment has a photosensitive layer constituting the surface thereof. That is, the photosensitive layer is a layer disposed on the outermost surface of the electrophotographic photoreceptor and constitutes the surface of the electrophotographic photoreceptor.

Further, the photosensitive layer constituting the surface thereof contains a polyester resin (1) having a dicarboxylic acid unit (A) represented by Formula (A) and a diol unit (B) represented by Formula (B).

The photosensitive layer in the electrophotographic photoreceptor may be a lamination type photosensitive layer having a charge generation layer and a charge transport layer or a single layer type photosensitive layer.

That is, the photosensitive layer that constitutes the surface thereof and contains the polyester resin (1) is a charge transport layer in a lamination type photosensitive layer or a single layer type photosensitive layer.

The electrophotographic photoreceptor includes a conductive substrate in addition to the photosensitive layer (that is, the lamination type photosensitive layer or the single layer type photosensitive layer). Further, the electrophotographic photoreceptor may further include other layers (for example, an undercoat layer and an interlayer) in addition to the conductive substrate and the photosensitive layer, as necessary.

Figure 3:
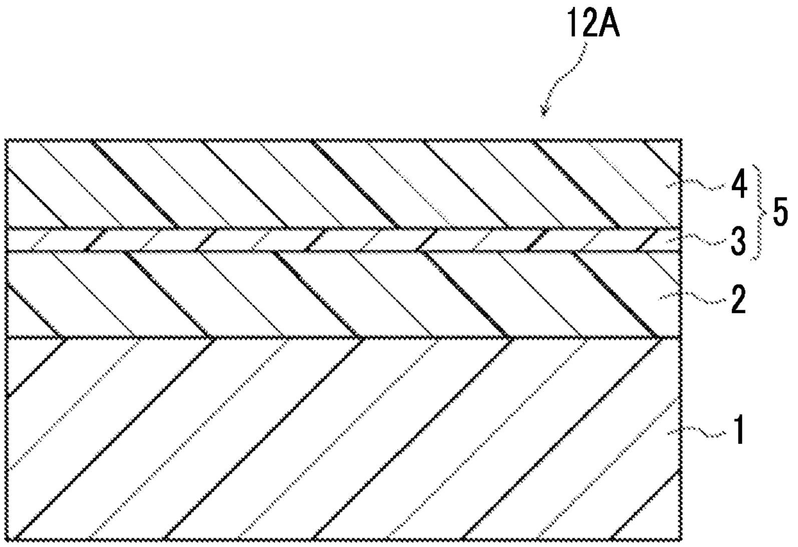
FIG. 3 is a partial cross-sectional view showing an example of a layer configuration of an electrophotographic photoreceptor.

FIG. 3 is a partial cross-sectional view schematically showing an example of the layer configuration of the photoreceptor. A photoreceptor 12A shown in FIG. 3 includes a lamination type photosensitive layer. The photoreceptor 12A has a structure in which an undercoat layer 2, a charge generation layer 3, and a charge transport layer 4 are laminated in this order on a conductive substrate 1, and the charge generation layer 3 and the charge transport layer 4 constitute a photosensitive layer 5 (so-called function separation type photosensitive layer). The photoreceptor 12A may include an interlayer (not shown) between the undercoat layer 2 and the charge generation layer 3.

Figure 4:
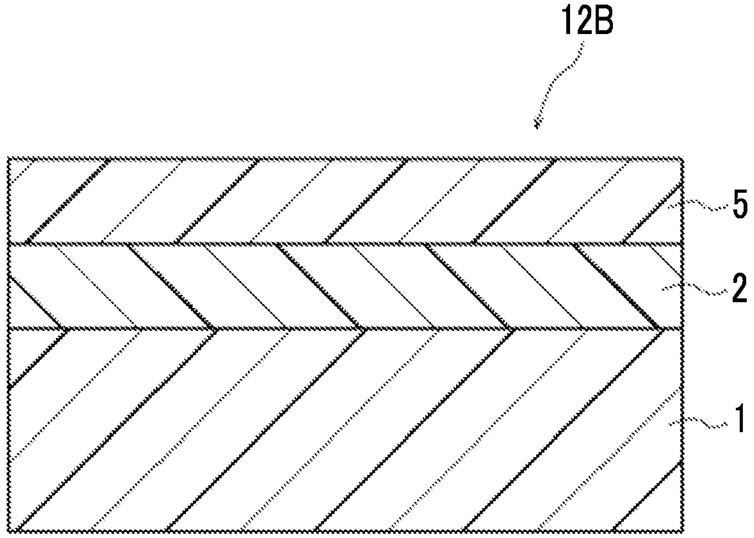
FIG. 4 is a partial cross-sectional view showing an example of a layer configuration of an electrophotographic photoreceptor.

FIG. 4 is a partial cross-sectional view schematically showing an example of the layer configuration of the photoreceptor. A photoreceptor 12B shown in FIG. 4 includes a single layer type photosensitive layer. The photoreceptor 12B has a structure in which the undercoat layer 2 and a single layer type photosensitive layer 5 are laminated in this order on the conductive substrate 1. The photoreceptor 12B may have an interlayer (not shown) between the undercoat layer 2 and the single layer type photosensitive layer 5.

Polyester Resin (1)

The photosensitive layer constituting the surface contains the polyester resin (1) as a binder resin. Specifically, in a case where the photosensitive layer is a lamination type photosensitive layer, the charge transport layer constituting the surface contains the polyester resin (1). Further, in a case where the photosensitive layer is a single layer type photosensitive layer, the single layer type photosensitive layer contains the polyester resin (1).

The polyester resin (1) has at least a dicarboxylic acid unit (A) represented by Formula (A) and a diol unit (B) represented by Formula (B). The polyester resin (1) may have other dicarboxylic acid units in addition to the dicarboxylic acid unit (A). The polyester resin (1) may have other diol units in addition to the diol unit (B).

The dicarboxylic acid unit (A) is a constitutional unit represented by Formula (A).

Formula (A)

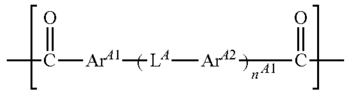

In Formula (A), $Ar^{A1}$ and $Ar^{A2}$ each independently represent an aromatic ring that may have a substituent, $L^{A}$ represents a single bond or a divalent linking group, and $n^{A1}$ represents 0, 1, or 2.

The aromatic ring as $Ar^{A1}$ may be any of a monocycle or a polycycle. Examples of the aromatic ring include a benzene ring, a naphthalene ring, an anthracene ring, and a phenanthrene ring. Among these, for example, a benzene ring and a naphthalene ring are preferable.

The hydrogen atom on the aromatic ring as $Ar^{A1}$ may be substituted with an alkyl group, an aryl group, an aralkyl group, an alkoxy group, an aryloxy group, a halogen atom, or the like. As the substituent in a case where the aromatic ring as $Ar^{A1}$ is substituted, for example, an alkyl group having 1 or more and 10 or less carbon atoms, an aryl group having 6 or more and 12 or less carbon atoms, and an alkoxy group having 1 or more and 6 or less carbon atoms are preferable.

The aromatic ring of $Ar^{A2}$ may be any of a monocycle or a polycycle. Examples of the aromatic ring include a benzene ring, a naphthalene ring, an anthracene ring, and a phenanthrene ring. Among these, for example, a benzene ring and a naphthalene ring are preferable.

The hydrogen atom on the aromatic ring as $Ar^{A2}$ may be substituted with an alkyl group, an aryl group, an aralkyl group, an alkoxy group, an aryloxy group, a halogen atom, or the like. As the substituent in a case where the aromatic ring as $Ar^{A2}$ is substituted, for example, an alkyl group having 1 or more and 10 or less carbon atoms, an aryl group having 6 or more and 12 or less carbon atoms, and an alkoxy group having 1 or more and 6 or less carbon atoms are preferable.

In a case where $L^4$ represents a divalent linking group, examples of the divalent linking group include an oxygen atom, a sulfur atom, and —C($Ra^1$)($Ra^2$)—. Here, $Ra^1$ and $Ra^2$ each independently represent a hydrogen atom, an alkyl group having 1 or more and 10 or less carbon atoms, an aryl group having 6 or more and 12 or less carbon atoms, or an aralkyl group having 7 or more and 20 or less carbon atoms, and $Ra^1$ and $Ra^2$ may be bonded to each other to form a cyclic alkyl group.

The alkyl group having 1 or more and 10 or less carbon atoms as $Ra^1$ and $Ra^2$ may be any of linear, branched, or cyclic. The number of carbon atoms of the alkyl group is, for example, preferably 1 or more and 6 or less, more preferably 1 or more and 4 or less, and still more preferably 1 or 2.

The aryl group having 6 or more and 12 or less carbon atoms as $Ra^1$ and $Ra^2$ may be any of a monocycle or a polycycle. The number of carbon atoms of the aryl group is, for example, preferably 6 or more and 10 or less and more preferably 6.

The alkyl group in the aralkyl group having 7 or more and 20 or less carbon atoms as $Ra^1$ and $Ra^2$ may be any of linear, branched, or cyclic. The number of carbon atoms of the alkyl group in the aralkyl group having 7 or more and 20 or less carbon atoms is, for example, preferably 1 or more and 4 or less, more preferably 1 or more and 3 or less, and still more preferably 1 or 2.

The aryl group in the aralkyl group having 7 or more and 20 or less carbon atoms as $Ra^1$ and $Ra^2$ may be any of a monocycle or a polycycle. The number of carbon atoms of the aryl group is, for example, preferably 6 or more and 10 or less and more preferably 6.

It is preferable that the dicarboxylic acid unit (A) includes, for example, at least one selected from the group consisting of a dicarboxylic acid unit (A1) represented by Formula (A1), a dicarboxylic acid unit (A2) represented by Formula (A2), a dicarboxylic acid unit (A3) represented by Formula (A3), and a dicarboxylic acid unit (A4) represented Formula (A4).

Formula (A1)

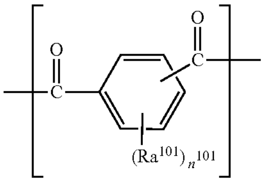

In Formula (A1), $n^{101}$ represents an integer of 0 or greater and 4 or less, and $n^{101}$ number of $Ra^{101}$'s each independently represent an alkyl group having 1 or more and 10 or less carbon atoms, an aryl group having 6 or more and 12 or less carbon atoms, or an alkoxy group having 1 or more and 6 or less carbon atoms.

$n^{101}$ represents, for example, preferably 0, 1, or 2, more preferably 0 or 1, and still more preferably 0.

Formula (A2)

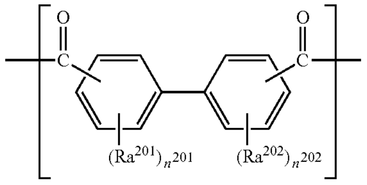

In Formula (A2), $n^{201}$ and $n^{202}$ each independently represent an integer of 0 or greater and 4 or less, and $n^{201}$ number of $Ra^{201}$'s and $n^{202}$ number of $Ra^{202}$'s each independently represent an alkyl group having 1 or more and 10 or less carbon atoms, an aryl group having 6 or more and 12 or less carbon atoms, or an alkoxy group having 1 or more and 6 or less carbon atoms.

$n^{201}$ represents, for example, preferably 0, 1, or 2, more preferably 0 or 1, and still more preferably 0.

$n^{202}$ represents, for example, preferably 0, 1, or 2, more preferably 0 or 1, and still more preferably 0.

Formula (A3)

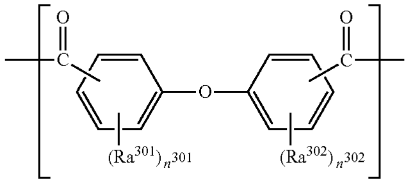

In Formula (A3), $n^{301}$ and $n^{302}$ each independently represent an integer of 0 or greater and 4 or less, and $n^{301}$ number of $Ra^{301}$'s and $n^{302}$ number of $Ra^{302}$'s each independently represent an alkyl group having 1 or more and 10 or less carbon atoms, an aryl group having 6 or more and 12 or less carbon atoms, or an alkoxy group having 1 or more and 6 or less carbon atoms.

$n^{301}$ represents, for example, preferably 0, 1, or 2, more preferably 0 or 1, and still more preferably 0.

$n^{302}$ represents, for example, preferably 0, 1, or 2, more preferably 0 or 1, and still more preferably 0.

Formula (A4)

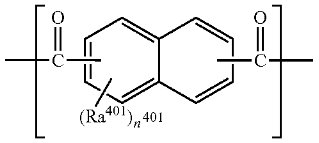

In Formula (A4), $n^{401}$ represents an integer of 0 or greater and 6 or less, and $n^{401}$ number of $Ra^{401}$'s each independently represent an alkyl group having 1 or more and 10 or less carbon atoms, an aryl group having 6 or more and 12 or less carbon atoms, or an alkoxy group having 1 or more and 6 or less carbon atoms.

$n^{401}$ represents, for example, preferably an integer of 0 or greater and 4 or less, more preferably 0, 1, or 2, and still more preferably 0.

The specific forms and the preferable forms of $Ra^{101}$ in Formula (A1), $Ra^{201}$ and $Ra^{202}$ in Formula (A2), $Ra^{301}$ and $Ra^{302}$ in Formula (A3), and $Ra^{401}$ in Formula (A4) are the same as each other, and hereinafter, $Ra^{101}$, $Ra^{201}$, $Ra^{202}$, $Ra^{301}$, $Ra^{302}$, and $Ra^{401}$ will be collectively referred to as "Ra".

The alkyl group having 1 or more and 10 or less carbon atoms as Ra may be any of linear, branched, or cyclic. The number of carbon atoms of the alkyl group is, for example, preferably 1 or more and 6 or less, more preferably 1 or more and 4 or less, and still more preferably 1 or 2.

Examples of the linear alkyl group having 1 or more and 10 or less carbon atoms include a methyl group, an ethyl group, an n-propyl group, an n-butyl group, an n-pentyl group, an n-hexyl group, an n-heptyl group, an n-octyl group, an n-nonyl group, and an n-decyl group.

Examples of the branched alkyl group having 3 or more and 10 or less carbon atoms include an isopropyl group, an isobutyl group, a sec-butyl group, a tert-butyl group, an isopentyl group, a neopentyl group, a tert-pentyl group, an isohexyl group, a sec-hexyl group, a tert-hexyl group, an isoheptyl group, a sec-heptyl group, a tert-heptyl group, an isooctyl group, a sec-octyl group, a tert-octyl group, an isononyl group, a sec-nonyl group, a tert-nonyl group, an isodecyl group, a sec-decyl group, and a tert-decyl group.

Examples of the cyclic alkyl group having 3 or more and 10 or less carbon atoms include a cyclopropyl group, a cyclobutyl group, a cyclopentyl group, a cyclohexyl group, a cycloheptyl group, a cyclooctyl group, a cyclononyl group, a cyclodecyl group, and polycyclic (for example, bicyclic, tricyclic, or spirocyclic) alkyl groups to which these monocyclic alkyl groups are linked.

The aryl group having 6 or more and 12 or less carbon atoms as Ra may be any of a monocycle or a polycycle. The number of carbon atoms of the aryl group is, for example, preferably 6 or more and 10 or less and more preferably 6.

Examples of the aryl group having 6 or more and 12 or less carbon atoms include a phenyl group, a biphenyl group, a 1-naphthyl group, and a 2-naphthyl group.

The alkyl group in the alkoxy group having 1 or more and 6 or less carbon atoms as Ra may be any of linear, branched, or cyclic. The number of carbon atoms of the alkyl group in the alkoxy group having 1 or more and 6 or less carbon atoms is, for example, preferably 1 or more and 4 or less, more preferably 1 or more and 3 or less, and still more preferably 1 or 2.

Examples of the linear alkoxy group having 1 or more and 6 or less carbon atoms include a methoxy group, an ethoxy group, an n-propoxy group, an n-butoxy group, an n-pentyloxy group, and an n-hexyloxy group.

Examples of the branched alkoxy group having 3 or more and 6 or less carbon atoms include an isopropoxy group, an isobutoxy group, a sec-butoxy group, a tert-butoxy group, an isopentyloxy group, a neopentyloxy group, a tert-pentyloxy group, an isohexyloxy group, a sec-hexyloxy group, and a tert-hexyloxy group.

Examples of the cyclic alkoxy group having 3 or more and 6 or less carbon atoms include a cyclopropoxy group, a cyclobutoxy group, a cyclopentyloxy group, and a cyclohexyloxy group.

Hereinafter, dicarboxylic acid units (A1-1) to (A1-9) are shown as specific examples of the dicarboxylic acid unit (A1). The dicarboxylic acid unit (A1) is not limited thereto.

(A1-1)

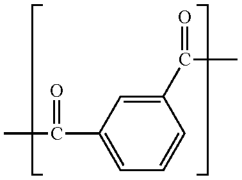

-continued (A1-2)

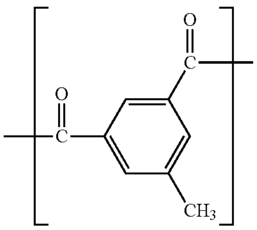

(A1-3)

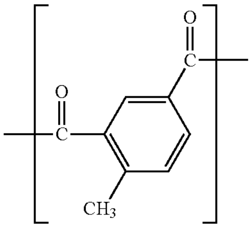

(A1-4)

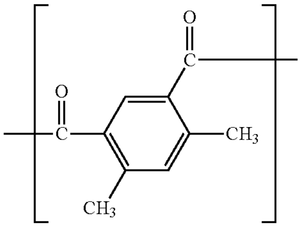

(A1-5)

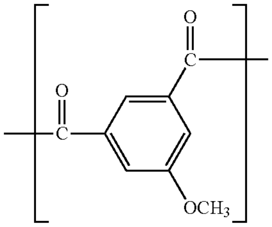

(A1-6)

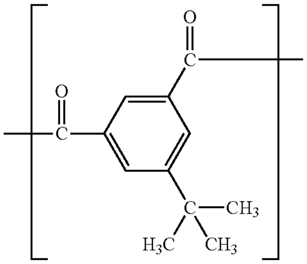

(A1-7)

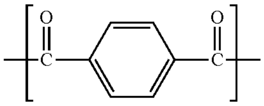

(A1-8)

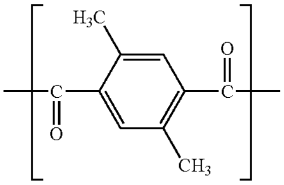

-continued (A1-9)

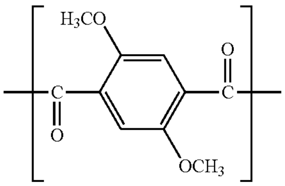

Hereinafter, dicarboxylic acid units (A2-1) to (A2-3) are shown as specific examples of the dicarboxylic acid unit (A2). The dicarboxylic acid unit (A2) is not limited thereto.

(A2-1)

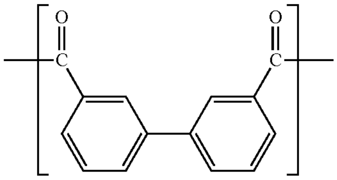

(A2-2)

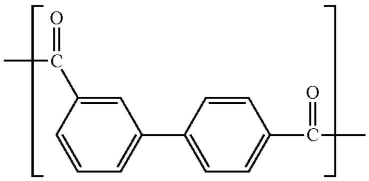

(A2-3)

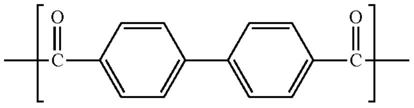

Hereinafter, dicarboxylic acid units (A3-1) and (A3-2) are shown as specific examples of the dicarboxylic acid unit (A3). The dicarboxylic acid unit (A3) is not limited thereto.

(A3-1)

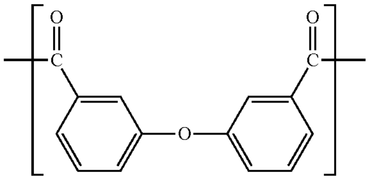

(A3-2)

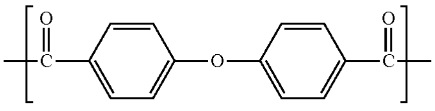

Hereinafter, dicarboxylic acid units (A4-1) to (A4-3) are shown as specific examples of the dicarboxylic acid unit (A4). The dicarboxylic acid unit (A4) is not limited thereto.

(A4-1)

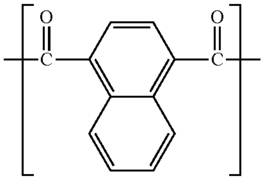

(A4-2)

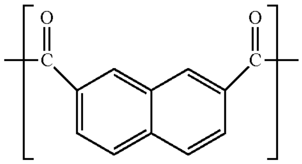

(A4-3)

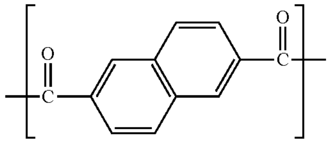

As the dicarboxylic acid unit (A), for example, (A-1), (A-7), (A2-3), (A3-2), and (A4-3) in the specific examples shown above are preferable, and (A2-3) is most preferable.

The total mass proportion of the dicarboxylic acid units (A1) to (A4) in the polyester resin (1) is, for example, preferably 15% by mass or greater and 60% by mass or less.

In a case where the total mass proportion of the dicarboxylic acid units (A1) to (A4) is 15% by mass or greater, the abrasion resistance of the photosensitive layer is enhanced. From this viewpoint, the total mass proportion of the dicarboxylic acid units (A1) to (A4) is, for example, more preferably 20% by mass or greater and still more preferably 25% by mass or greater.

In a case where the total mass proportion of the dicarboxylic acid units (A1) to (A4) is 60% by mass or less, peeling of the photosensitive layer can be suppressed. From this viewpoint, the total mass proportion of the dicarboxylic acid units (A1) to (A4) is, for example, more preferably 55% by mass or less and still more preferably 50% by mass or less.

The dicarboxylic acid units (A1) to (A4) contained in the polyester resin (1) may be used alone or in combination of two or more kinds thereof.

Examples of other dicarboxylic acid units (A) in addition to the dicarboxylic acid units (A1) to (A4) include aliphatic dicarboxylic acid (such as oxalic acid, malonic acid, maleic acid, fumaric acid, citraconic acid, itaconic acid, glutaconic acid, succinic acid, alkenyl succinic acid, adipic acid, and sebacic acid) units, alicyclic dicarboxylic acid (such as cyclohexanedicarboxylic acid) units, lower (for example, having 1 or more and 5 or less carbon atoms) alkyl ester units thereof, and aromatic dicarboxylic acid units represented by Formulae (A5) to (A8). These dicarboxylic acid units contained in the polyester resin (1) may be used alone or in combination of two or more kinds thereof.

The dicarboxylic acid unit (A) contained in the polyester resin (1) may be used alone or in combination of two or more kinds thereof.

The diol unit (B) is a constitutional unit represented by Formula (B).

Formula (B)

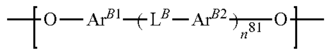

In Formula (B), $Ar^{B1}$ and $Ar^{B2}$ each independently represent an aromatic ring that may have a substituent, $L^B$ represents a single bond, an oxygen atom, a sulfur atom, or —C($Rb^1$)($Rb^2$)—, and $n^{B1}$ represents 0, 1, or 2, and $Rb^1$ and $Rb^2$ each independently represent a hydrogen atom, an alkyl group having 1 or more and 20 or less carbon atoms, an aryl group having 6 or more and 12 or less carbon atoms, or an aralkyl group having 7 or more and 20 or less carbon atoms, and $Rb^1$ and $Rb^2$ may be bonded to each other to form a cyclic alkyl group.

The aromatic ring as $Ar^{B1}$ may be any of a monocycle or a polycycle. Examples of the aromatic ring include a benzene ring, a naphthalene ring, an anthracene ring, and a phenanthrene ring. Among these, for example, a benzene ring and a naphthalene ring are preferable.

The hydrogen atom on the aromatic ring as $Ar^{B1}$ may be substituted with an alkyl group, an aryl group, an aralkyl group, an alkoxy group, an aryloxy group, a halogen atom, or the like. As the substituent in a case where the aromatic ring as $Ar^{B1}$ is substituted, for example, an alkyl group having 1 or more and 10 or less carbon atoms, an aryl group having 6 or more and 12 or less carbon atoms, and an alkoxy group having 1 or more and 6 or less carbon atoms are preferable.

The aromatic ring as $Ar^{B2}$ may be any of a monocycle or a polycycle. Examples of the aromatic ring include a benzene ring, a naphthalene ring, an anthracene ring, and a phenanthrene ring. Among these, for example, a benzene ring and a naphthalene ring are preferable.

The hydrogen atom on the aromatic ring as $Ar^{B2}$ may be substituted with an alkyl group, an aryl group, an aralkyl group, an alkoxy group, an aryloxy group, a halogen atom, or the like. As the substituent in a case where the aromatic ring as $Ar^{B2}$ is substituted, for example, an alkyl group having 1 or more and 10 or less carbon atoms, an aryl group having 6 or more and 12 or less carbon atoms, and an alkoxy group having 1 or more and 6 or less carbon atoms are preferable.

The alkyl group having 1 or more and 20 or less carbon atoms as $Rb^1$ and $Rb^2$ may be linear, branched, or cyclic. The number of carbon atoms of the alkyl group is, for example, preferably 1 or more and 18 or less, more preferably 1 or more and 14 or less, and still more preferably 1 or more and 10 or less.

The aryl group having 6 or more and 12 or less carbon atoms as $Rb^1$ and $Rb^2$ may be any of a monocycle or a polycycle. The number of carbon atoms of the aryl group is, for example, preferably 6 or more and 10 or less and more preferably 6.

The alkyl group in the aralkyl group having 7 or more and 20 or less carbon atoms as $Rb^1$ and $Rb^2$ may be any of linear, branched, or cyclic. The number of carbon atoms of the alkyl group in the aralkyl group having 7 or more and 20 or less carbon atoms is, for example, preferably 1 or more and 4 or less, more preferably 1 or more and 3 or less, and still more preferably 1 or 2.

The aryl group in the aralkyl group having 7 or more and 20 or less carbon atoms as $Rb^1$ and $Rb^2$ may be any of a monocycle or a polycycle. The number of carbon atoms of the aryl group is, for example, preferably 6 or more and 10 or less and more preferably 6.

It is preferable that the diol unit (B) includes, for example, at least one selected from the group consisting of a diol unit (B1) represented by Formula (B1), a diol unit (B2) represented by Formula (B2), a diol unit (B3) represented by Formula (B3), a diol unit (B4) represented by Formula (B4), a diol unit (B5) represented by Formula (B5), a diol unit (B6) represented by Formula (B6), a diol unit (B7) represented by Formula (B7), and a diol unit (B8) represented by Formula (B8).

The diol unit (B) includes, for example, more preferably at least one selected from the group consisting of a diol unit (B1) represented by Formula (B1), a diol unit (B2) represented by Formula (B2), a diol unit (B4) represented by Formula (B4), a diol unit (B5) represented by Formula (B5), and a diol unit (B6) represented by Formula (B6), still more preferably at least one selected from the group consisting of a diol unit (B1) represented by Formula (B1), a diol unit (B2) represented by Formula (B2), a diol unit (B5) represented by Formula (B5), and a diol unit (B6) represented by Formula (B6), even still more preferably at least one selected from the group consisting of a diol unit (B1) represented by Formula (B1), a diol unit (B2) represented by Formula (B2), and a diol unit (B6) represented by Formula (B6), and most preferably at least one selected from the group consisting of a diol unit (B1) represented by Formula (B1) and a diol unit (B2) represented by Formula (B2).

Formula (B1)

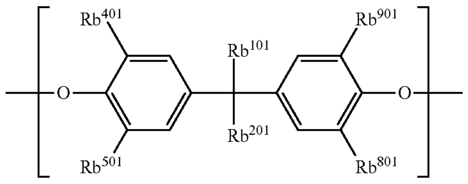

In Formula (B1), $Rb^{101}$ represents a branched alkyl group having 4 or more and 20 or less carbon atoms, $Rb^{201}$ represents a hydrogen atom or an alkyl group having 1 or more and 3 or less carbon atoms, and $Rb^{401}$, $Rb^{501}$, $Rb^{801}$, and $Rb^{901}$ each independently represent a hydrogen atom, an alkyl group having 1 or more and 4 or less carbon atoms, an alkoxy group having 1 or more and 6 or less carbon atoms, or a halogen atom.

The number of carbon atoms of the branched alkyl group having 4 or more and 20 or less carbon atoms as $Rb^{101}$ is, for example, preferably 4 or more and 16 or less, more preferably 4 or more and 12 or less, and still more preferably 4 or more and 8 or less. Specific examples of $Rb^{101}$ include an isobutyl group, a sec-butyl group, a tert-butyl group, an isopentyl group, a neopentyl group, a tert-pentyl group, an isohexyl group, a sec-hexyl group, a tert-hexyl group, an isoheptyl group, a sec-heptyl group, a tert-heptyl group, an isooctyl group, a sec-octyl group, a tert-octyl group, an isononyl group, a sec-nonyl group, a tert-nonyl group, an isodecyl group, a sec-decyl group, a tert-decyl group, an isododecyl group, a sec-dodecyl group, a tert-dodecyl group, a tert-tetradecyl group, and a tert-pentadecyl group.

Formula (B2)

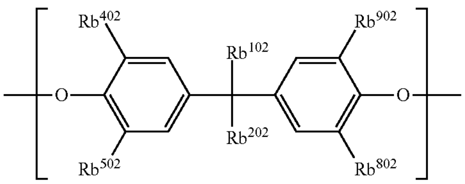

In Formula (B2), $Rb^{102}$ represents a linear alkyl group having 4 or more and 20 or less carbon atoms, $Rb^{202}$ represents a hydrogen atom or an alkyl group having 1 or more and 3 or less carbon atoms, and $Rb^{402}$, $Rb^{502}$, $Rb^{802}$, and $Rb^{902}$ each independently represent a hydrogen atom, an alkyl group having 1 or more and 4 or less carbon atoms, an alkoxy group having 1 or more and 6 or less carbon atoms, or a halogen atom.

The number of carbon atoms of the linear alkyl group having 4 or more and 20 or less carbon atoms as $Rb^{102}$ is, for example, preferably 4 or more and 16 or less, more preferably 4 or more and 12 or less, and still more preferably 4 or more and 8 or less. Specific examples of $Rb^{102}$ include an n-butyl group, an n-pentyl group, an n-hexyl group, an n-heptyl group, an n-octyl group, an n-nonyl group, an n-decyl group, an n-undecyl group, an n-dodecyl group, a tridecyl group, an n-tetradecyl group, an n-pentadecyl group, an n-heptadecyl group, an n-octadecyl group, an n-nonadecyl group, and an n-icosyl group.

Formula (B3)

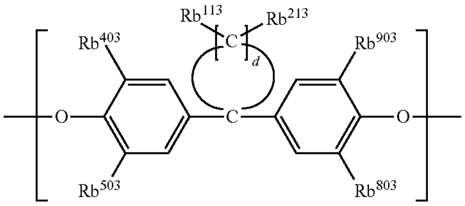

In Formula (B3), $Rb^{113}$ and $Rb^{213}$ each independently represent a hydrogen atom, a linear alkyl group having 1 or more and 3 or less carbon atoms, an alkoxy group having 1 or more and 4 or less carbon atoms, or a halogen atom, d represents an integer of 7 or greater and 15 or less, and $Rb^{403}$, $Rb^{503}$, $Rb^{803}$, and $Rb^{903}$ each independently represent a hydrogen atom, an alkyl group having 1 or more and 4 or less carbon atoms, an alkoxy group having 1 or more and 6 or less carbon atoms, or a halogen atom.

The number of carbon atoms of the linear alkyl group having 1 or more and 3 or less carbon atoms as $Rb^{113}$ and $Rb^{213}$ is, for example, preferably 1 or 2 and more preferably 1. Specific examples of such a group include a methyl group, an ethyl group, and an n-propyl group.

The alkyl group in the alkoxy group having 1 or more and 4 or less carbon atoms as $Rb^{113}$ and $Rb^{213}$ may be linear, branched, or cyclic. The number of carbon atoms of the alkyl group in the alkoxy group having 1 or more and 4 or less carbon atoms is, for example, preferably 1 or more and 3 or less, more preferably 1 or 2, and still more preferably 1. Specific examples of such a group include a methoxy group, an ethoxy group, an n-propoxy group, an n-butoxy group, an isopropoxy group, an isobutoxy group, a sec-butoxy group, a tert-butoxy group, a cyclopropoxy group, and a cyclobutoxy group.

Examples of the halogen atom as $Rb^{113}$ and $Rb^{213}$ include a fluorine atom, a chlorine atom, a bromine atom, and an iodine atom.

Formula (B4)

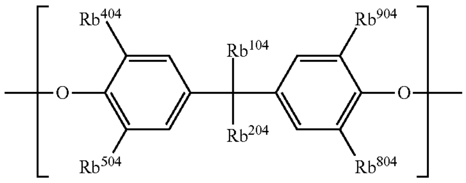

In Formula (B4), $Rb^{104}$ and $Rb^{204}$ each independently represent a hydrogen atom, an alkyl group having 1 or more and 3 or less carbon atoms, and $Rb^{404}$, $Rb^{504}$, $Rb^{804}$, and $Rb^{904}$ each independently represent a hydrogen atom, an alkyl group having 1 or more and 4 or less carbon atoms, an alkoxy group having 1 or more and 6 or less carbon atoms, or a halogen atom.

The alkyl group having 1 or more and 3 or less carbon atoms as $Rb^{104}$ may be any of linear, branched, or cyclic. The number of carbon atoms of the alkyl group is, for example, preferably 1 or 2 and more preferably 1. Specific examples of $Rb^{104}$ include a methyl group, an ethyl group, an n-propyl group, an isopropyl group, and a cyclopropyl group.

Formula (B5)

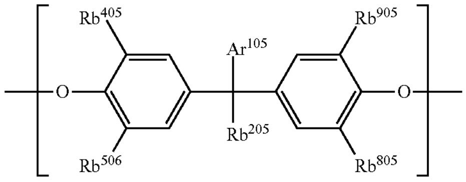

In Formula (B5), $Ar^{105}$ represents an aryl group having 6 or more and 12 or less carbon atoms or an aralkyl group having 7 or more and 20 or less carbon atoms, $Rb^{205}$ represents a hydrogen atom or an alkyl group having 1 or more and 3 or less carbon atoms, and $Rb^{405}$, $Rb^{505}$, $Rb^{805}$, and $Rb^{905}$ each independently represent a hydrogen atom, an alkyl group having 1 or more and 4 or less carbon atoms, an alkoxy group having 1 or more and 6 or less carbon atoms, or a halogen atom.

The aryl group having 6 or more and 12 or less carbon atoms as $Ar^{105}$ may be any of a monocycle or a polycycle. The number of carbon atoms of the aryl group is, for example, preferably 6 or more and 10 or less and more preferably 6.

The alkyl group in the aralkyl group having 7 or more and 20 or less carbon atoms as $Ar^{105}$ may be any of linear, branched, or cyclic. The number of carbon atoms of the alkyl group in the aralkyl group having 7 or more and 20 or less carbon atoms is, for example, preferably 1 or more and 4 or less, more preferably 1 or more and 3 or less, and still more preferably 1 or 2. The aryl group in the aralkyl group having 7 or more and 20 or less carbon atoms as $Ar^{105}$ may be any of a monocycle or a polycycle. The number of carbon atoms of the aryl group is, for example, preferably 6 or more and 10 or less and more preferably 6. Examples of the aralkyl group having 7 or more and 20 or less carbon atoms include a benzyl group, a phenylethyl group, a phenylpropyl group, a 4-phenylbutyl group, a phenylpentyl group, a phenylhexyl group, a phenylheptyl group, a phenyloctyl group, a phenylnonyl group, a naphthylmethyl group, a naphthylethyl group, an anthracenylmethyl group, and a phenyl-cyclopentylmethyl group.

Formula (B6)

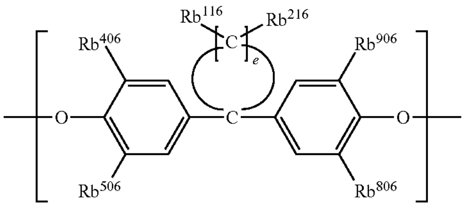

In Formula (B6), $Rb^{116}$ and $Rb^{216}$ each independently represent a hydrogen atom, a linear alkyl group having 1 or more and 3 or less carbon atoms, an alkoxy group having 1 or more and 4 or less carbon atoms, or a halogen atom, e represents an integer of 4 or greater and 6 or less, and $Rb^{406}$, $Rb^{506}$, $Rb^{806}$, and $Rb^{906}$ each independently represent a hydrogen atom, an alkyl group having 1 or more and 4 or less carbon atoms, an alkoxy group having 1 or more and 6 or less carbon atoms, or a halogen atom.

The number of carbon atoms of the linear alkyl group having 1 or more and 3 or less carbon atoms as $Rb^{116}$ and $Rb^{216}$ is, for example, preferably 1 or 2 and more preferably 1. Specific examples of such a group include a methyl group, an ethyl group, and an n-propyl group.

The alkyl group in the alkoxy group having 1 or more and 4 or less carbon atoms as $Rb^{116}$ and $Rb^{216}$ may be linear, branched, or cyclic. The number of carbon atoms of the alkyl group in the alkoxy group having 1 or more and 4 or less carbon atoms is, for example, preferably 1 or more and 3 or less, more preferably 1 or 2, and still more preferably 1. Specific examples of such a group include a methoxy group, an ethoxy group, an n-propoxy group, an n-butoxy group, an isopropoxy group, an isobutoxy group, a sec-butoxy group, a tert-butoxy group, a cyclopropoxy group, and a cyclobutoxy group.

Examples of the halogen atom as $Rb^{116}$ and $Rb^{216}$ include a fluorine atom, a chlorine atom, a bromine atom, and an iodine atom.

Formula (B7)

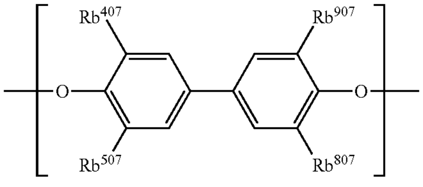

In Formula (B7), $Rb^{407}$, $Rb^{507}$, $Rb^{807}$, and $Rb^{907}$ each independently represent a hydrogen atom, an alkyl group having 1 or more and 4 or less carbon atoms, an alkoxy group having 1 or more and 6 or less carbon atoms, or a halogen atom.

Formula (B8)

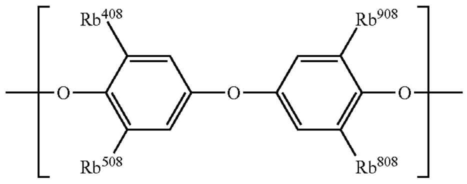

In Formula (B8), $Rb^{408}$, $Rb^{508}$, $Rb^{808}$, and $Rb^{908}$ each independently represent a hydrogen atom, an alkyl group having 1 or more and 4 or less carbon atoms, an alkoxy group having 1 or more and 6 or less carbon atoms, or a halogen atom.

The specific forms and the preferable forms of $Rb^{201}$ in Formula (B1), $Rb^{202}$ in Formula (B2), $Rb^{204}$ in Formula (B4), and $Rb^{205}$ in Formula (B5) are the same as each other, and hereinafter, $Rb^{201}$, $Rb^{202}$, $Rb^{204}$, and $Rb^{205}$ will be collectively referred to as "$Rb^{200}$".

The alkyl group having 1 or more and 3 or less carbon atoms as $Rb^{200}$ may be any of linear, branched, or cyclic. The number of carbon atoms of the alkyl group is, for example, preferably 1 or 2 and more preferably 1.

The alkyl group having 1 or more and 3 or less carbon atoms includes a methyl group, an ethyl group, an n-propyl group, an isopropyl group, and a cyclopropyl group.

The specific forms and the preferable forms of $Rb^{401}$ in Formula (B1), $Rb^{402}$ in Formula (B2), $Rb^{403}$ in Formula (B3), $Rb^{404}$ in Formula (B4), $Rb^{405}$ in Formula (B5), $Rb^{406}$ in Formula (B6), $Rb^{407}$ in Formula (B7), and $Rb^{408}$ in Formula (B8) are the same as each other, and hereinafter, $Rb^{401}$, $Rb^{402}$, $Rb^{403}$, $Rb^{404}$, $Rb^{405}$, $Rb^{406}$, $Rb^{407}$, and $Rb^{408}$ will be collectively referred to as "$Rb^{400}$".

The alkyl group having 1 or more and 4 or less carbon atoms as $Rb^{400}$ may be any of linear, branched, or cyclic. The number of carbon atoms of the alkyl group is, for example, preferably 1 or more and 3 or less, more preferably 1 or 2, and still more preferably 1.

Examples of the linear alkyl group having 1 or more and 4 or less carbon atoms include a methyl group, an ethyl group, an n-propyl group, and an n-butyl group.

Examples of the branched alkyl group having 3 or 4 carbon atoms include an isopropyl group, an isobutyl group, a sec-butyl group, and a tert-butyl group.

Examples of the cyclic alkyl group having 3 or 4 carbon atoms includes a cyclopropyl group and a cyclobutyl group.

The alkyl group in the alkoxy group having 1 or more and 6 or less carbon atoms as $Rb^{400}$ may be any of linear, branched, or cyclic. The number of carbon atoms of the alkyl group in the alkoxy group having 1 or more and 6 or less carbon atoms is, for example, preferably 1 or more and 4 or less, more preferably 1 or more and 3 or less, and still more preferably 1 or 2.

Examples of the linear alkoxy group having 1 or more and 6 or less carbon atoms include a methoxy group, an ethoxy group, an n-propoxy group, an n-butoxy group, an n-pentyloxy group, and an n-hexyloxy group.

Examples of the branched alkoxy group having 3 or more and 6 or less carbon atoms include an isopropoxy group, an isobutoxy group, a sec-butoxy group, a tert-butoxy group, an isopentyloxy group, a neopentyloxy group, a tert-pentyloxy group, an isohexyloxy group, a sec-hexyloxy group, and a tert-hexyloxy group.

Examples of the cyclic alkoxy group having 3 or more and 6 or less carbon atoms include a cyclopropoxy group, a cyclobutoxy group, a cyclopentyloxy group, and a cyclohexyloxy group.

Examples of the halogen atom as $Rb^{400}$ include a fluorine atom, a chlorine atom, a bromine atom, and an iodine atom.

The specific forms and the preferable forms of $Rb^{501}$ in Formula (B1), $Rb^{502}$ in Formula (B2), $Rb^{503}$ in Formula (B3), $Rb^{504}$ in Formula (B4), $Rb^{505}$ in Formula (B5), $Rb^{506}$ in Formula (B6), $Rb^{507}$ in Formula (B7), and $Rb^{508}$ in Formula (B8) are the same as each other, and hereinafter, $Rb^{501}$, $Rb^{502}$, $Rb^{503}$, $Rb^{504}$, $Rb^{505}$, $Rb^{506}$, $Rb^{507}$, and $Rb^{508}$ will be collectively referred to as "$Rb^{500}$".

The alkyl group having 1 or more and 4 or less carbon atoms as $Rb^{500}$ may be any of linear, branched, or cyclic. The number of carbon atoms of the alkyl group is, for example, preferably 1 or more and 3 or less, more preferably 1 or 2, and still more preferably 1.

Examples of the linear alkyl group having 1 or more and 4 or less carbon atoms include a methyl group, an ethyl group, an n-propyl group, and an n-butyl group.

Examples of the branched alkyl group having 3 or 4 carbon atoms include an isopropyl group, an isobutyl group, a sec-butyl group, and a tert-butyl group.

Examples of the cyclic alkyl group having 3 or 4 carbon atoms includes a cyclopropyl group and a cyclobutyl group.

The alkyl group in the alkoxy group having 1 or more and 6 or less carbon atoms as $Rb^{500}$ may be any of linear, branched, or cyclic. The number of carbon atoms of the alkyl group in the alkoxy group having 1 or more and 6 or less carbon atoms is, for example, preferably 1 or more and 4 or less, more preferably 1 or more and 3 or less, and still more preferably 1 or 2.

Examples of the linear alkoxy group having 1 or more and 6 or less carbon atoms include a methoxy group, an ethoxy group, an n-propoxy group, an n-butoxy group, an n-pentyloxy group, and an n-hexyloxy group.

Examples of the branched alkoxy group having 3 or more and 6 or less carbon atoms include an isopropoxy group, an isobutoxy group, a sec-butoxy group, a tert-butoxy group, an isopentyloxy group, a neopentyloxy group, a tert-pentyloxy group, an isohexyloxy group, a sec-hexyloxy group, and a tert-hexyloxy group.

Examples of the cyclic alkoxy group having 3 or more and 6 or less carbon atoms include a cyclopropoxy group, a cyclobutoxy group, a cyclopentyloxy group, and a cyclohexyloxy group.

Examples of the halogen atom as $Rb^{500}$ include a fluorine atom, a chlorine atom, a bromine atom, and an iodine atom.

The specific forms and the preferable forms of $Rb^{801}$ in Formula (B1), $Rb^{802}$ in Formula (B2), $Rb^{803}$ in Formula (B3), $Rb^{804}$ in Formula (B4), $Rb^{805}$ in Formula (B5), $Rb^{806}$ in Formula (B6), $Rb^{807}$ in Formula (B7), and $Rb^{808}$ in Formula (B8) are the same as each other, and hereinafter, $Rb^{801}$, $Rb^{802}$, $Rb^{803}$, $Rb^{804}$, $Rb^{805}$, $Rb^{806}$, $Rb^{807}$, and $Rb^{808}$ will be collectively referred to as "$Rb^{800}$".

The alkyl group having 1 or more and 4 or less carbon atoms as $Rb^{800}$ may be any of linear, branched, or cyclic. The number of carbon atoms of the alkyl group is, for example, preferably 1 or more and 3 or less, more preferably 1 or 2, and still more preferably 1.

Examples of the linear alkyl group having 1 or more and 4 or less carbon atoms include a methyl group, an ethyl group, an n-propyl group, and an n-butyl group.

Examples of the branched alkyl group having 3 or 4 carbon atoms include an isopropyl group, an isobutyl group, a sec-butyl group, and a tert-butyl group.

Examples of the cyclic alkyl group having 3 or 4 carbon atoms includes a cyclopropyl group and a cyclobutyl group.

The alkyl group in the alkoxy group having 1 or more and 6 or less carbon atoms as $Rb^{800}$ may be any of linear, branched, or cyclic. The number of carbon atoms of the alkyl group in the alkoxy group having 1 or more and 6 or less carbon atoms is, for example, preferably 1 or more and 4 or less, more preferably 1 or more and 3 or less, and still more preferably 1 or 2.

Examples of the linear alkoxy group having 1 or more and 6 or less carbon atoms include a methoxy group, an ethoxy group, an n-propoxy group, an n-butoxy group, an n-pentyloxy group, and an n-hexyloxy group.

Examples of the branched alkoxy group having 3 or more and 6 or less carbon atoms include an isopropoxy group, an isobutoxy group, a sec-butoxy group, a tert-butoxy group, an isopentyloxy group, a neopentyloxy group, a tert-pentyloxy group, an isohexyloxy group, a sec-hexyloxy group, and a tert-hexyloxy group.

Examples of the cyclic alkoxy group having 3 or more and 6 or less carbon atoms include a cyclopropoxy group, a cyclobutoxy group, a cyclopentyloxy group, and a cyclohexyloxy group.

Examples of the halogen atom as $Rb^{800}$ include a fluorine atom, a chlorine atom, a bromine atom, and an iodine atom.

The specific forms and the preferable forms of $Rb^{901}$ in Formula (B1), $Rb^{902}$ in Formula (B2), $Rb^{903}$ in Formula (B3), $Rb^{904}$ in Formula (B4), $Rb^{905}$ in Formula (B5), $Rb^{906}$ in Formula (B6), $Rb^{907}$ in Formula (B7), and $Rb^{908}$ in Formula (B8) are the same as each other, and hereinafter, $Rb^{901}$, $Rb^{902}$, $Rb^{903}$, $Rb^{904}$, $Rb^{905}$, $Rb^{906}$, $Rb^{907}$, and $Rb^{908}$ will be collectively referred to as "$Rb^{900}$".

The alkyl group having 1 or more and 4 or less carbon atoms as $Rb^{900}$ may be any of linear, branched, or cyclic. The number of carbon atoms of the alkyl group is, for example, preferably 1 or more and 3 or less, more preferably 1 or 2, and still more preferably 1.

Examples of the linear alkyl group having 1 or more and 4 or less carbon atoms include a methyl group, an ethyl group, an n-propyl group, and an n-butyl group.

Examples of the branched alkyl group having 3 or 4 carbon atoms include an isopropyl group, an isobutyl group, a sec-butyl group, and a tert-butyl group.

Examples of the cyclic alkyl group having 3 or 4 carbon atoms includes a cyclopropyl group and a cyclobutyl group.

The alkyl group in the alkoxy group having 1 or more and 6 or less carbon atoms as $Rb^{900}$ may be any of linear, branched, or cyclic. The number of carbon atoms of the alkyl group in the alkoxy group having 1 or more and 6 or less carbon atoms is, for example, preferably 1 or more and 4 or less, more preferably 1 or more and 3 or less, and still more preferably 1 or 2.

Examples of the linear alkoxy group having 1 or more and 6 or less carbon atoms include a methoxy group, an ethoxy group, an n-propoxy group, an n-butoxy group, an n-pentyloxy group, and an n-hexyloxy group.

Examples of the branched alkoxy group having 3 or more and 6 or less carbon atoms include an isopropoxy group, an isobutoxy group, a sec-butoxy group, a tert-butoxy group, an isopentyloxy group, a neopentyloxy group, a tert-pentyloxy group, an isohexyloxy group, a sec-hexyloxy group, and a tert-hexyloxy group.

Examples of the cyclic alkoxy group having 3 or more and 6 or less carbon atoms include a cyclopropoxy group, a cyclobutoxy group, a cyclopentyloxy group, and a cyclohexyloxy group.

Examples of the halogen atom as $Rb^{900}$ include a fluorine atom, a chlorine atom, a bromine atom, and an iodine atom.

Hereinafter, diol units (B1-1) to (B1-6) are shown as specific examples of the diol unit (B1). The diol unit (B1) is not limited thereto.

(B1-1)

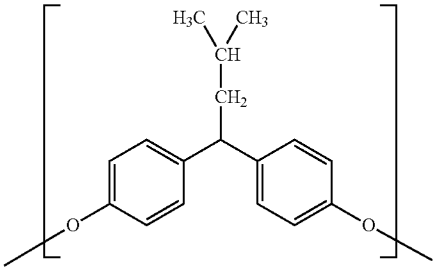

(B1-2)

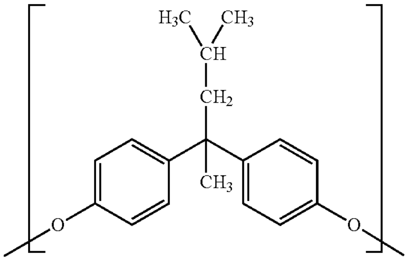

(B1-3)

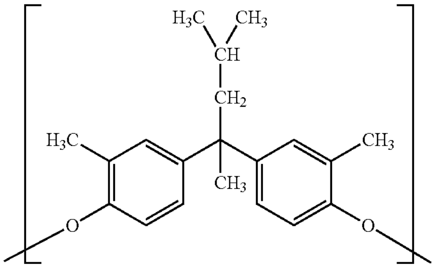

(B1-4)

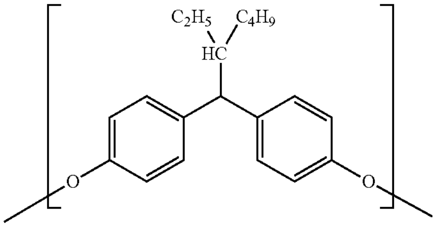

(B1-5)

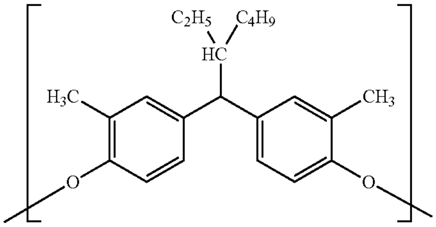

-continued (B1-6)

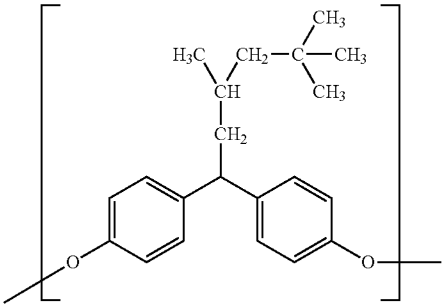

Hereinafter, diol units (B2-1) to (B2-11) are shown as specific examples of the diol unit (B2). The diol unit (B2) is not limited thereto.

(B2-1)

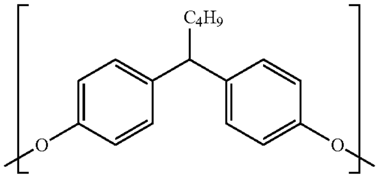

(B2-2)

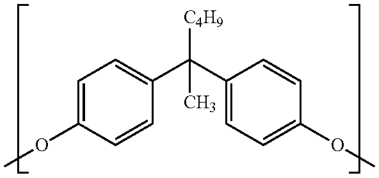

(B2-3)

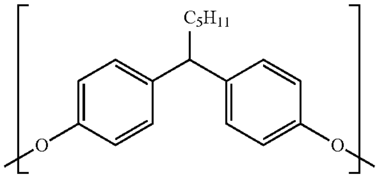

(B2-4)

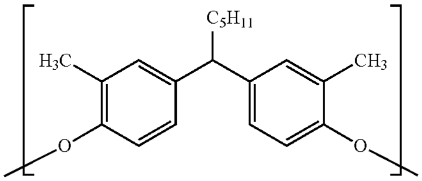

(B2-5)

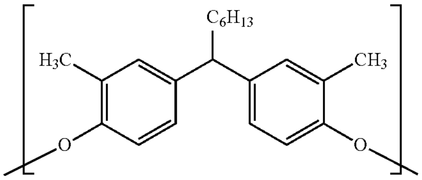

(B2-6)

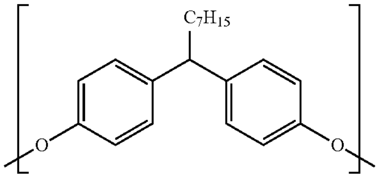

-continued
(B2-7)
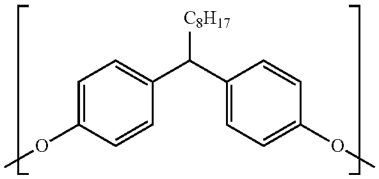
(B2-8)
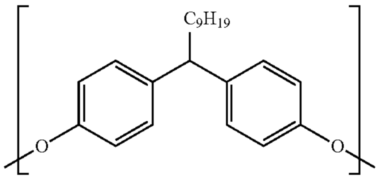
(B2-9)
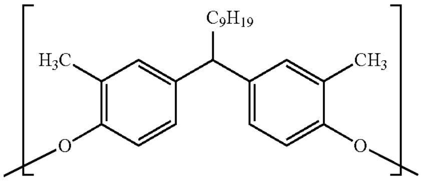
(B2-10)
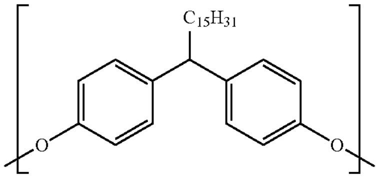
(B2-11)
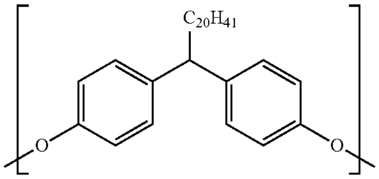
Hereinafter, diol units (B3-1) to (B3-4) are shown as specific examples of the diol unit (B3). The diol unit (B3) is not limited thereto.
(B3-1)
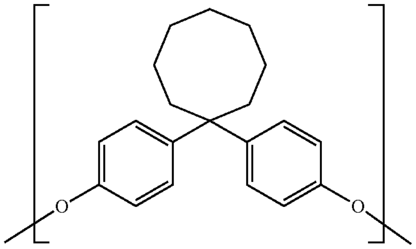
(B3-2)
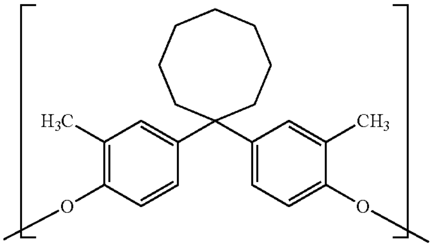
-continued
(B3-3)
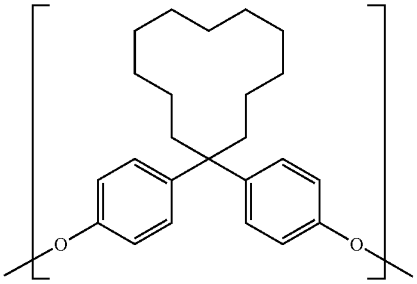
(B3-4)
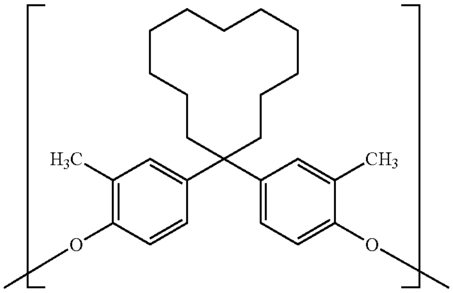
Hereinafter, diol units (B4-1) to (B4-7) are shown as specific examples of the diol unit (B4). The diol unit (B4) is not limited thereto.
(B4-1)
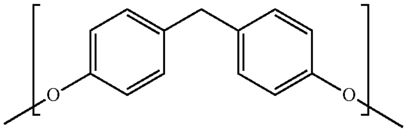
(B4-2)
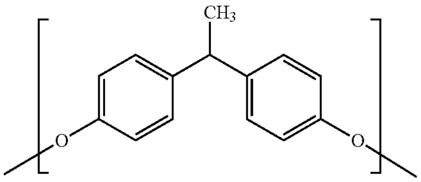
(B4-3)
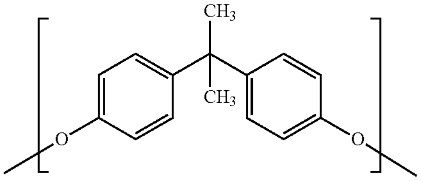
(B4-4)
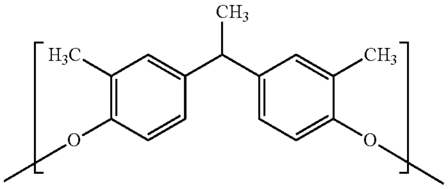

-continued
(B4-5)
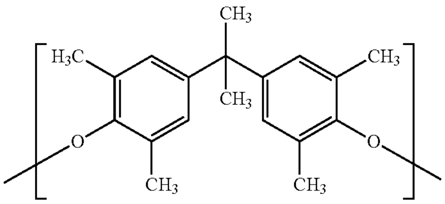
(B4-6)
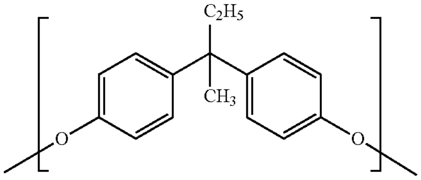
(B4-7)
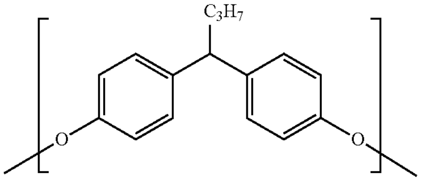
Hereinafter, diol units (B5-1) to (B5-6) are shown as specific examples of the diol unit (B5). The diol unit (B5) is not limited thereto.
(B5-1)
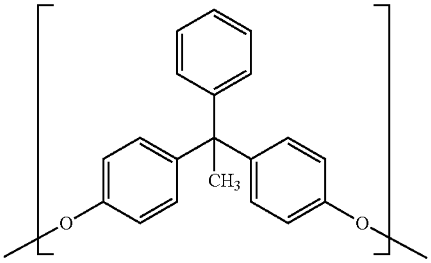
(B5-2)
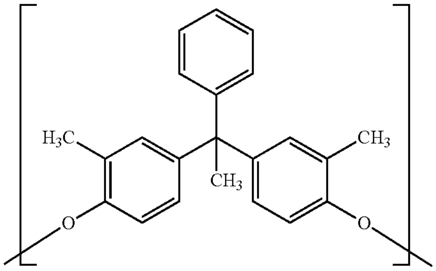
(B5-3)
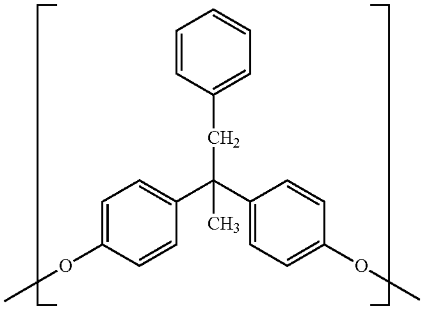
-continued
(B5-4)
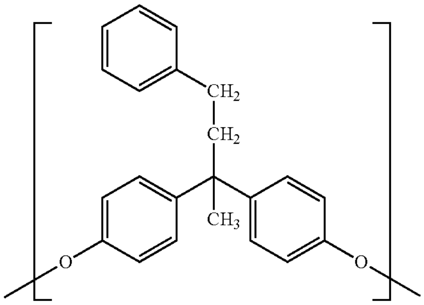
(B5-5)
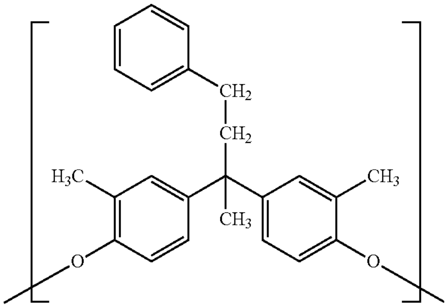
(B5-6)
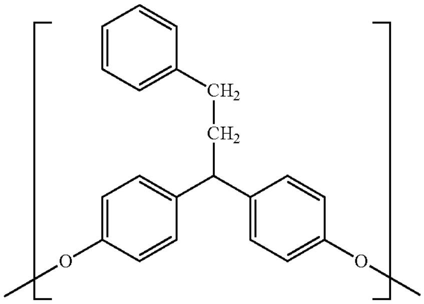
Hereinafter, diol units (B6-1) to (B6-4) are shown as specific examples of the diol unit (B6). The diol unit (B6) is not limited thereto.
(B6-1)
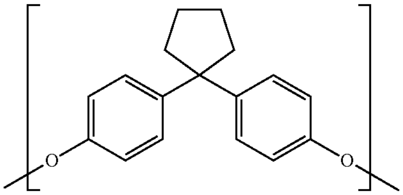
(B6-2)
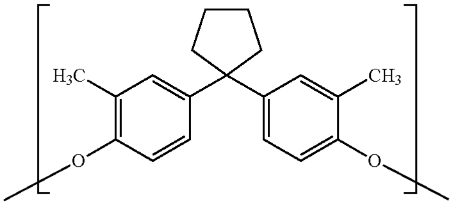

-continued (B6-3)

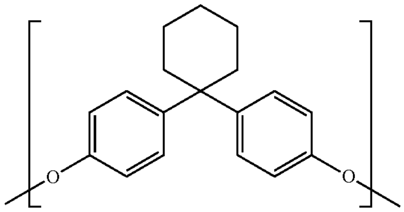

(B6-4)

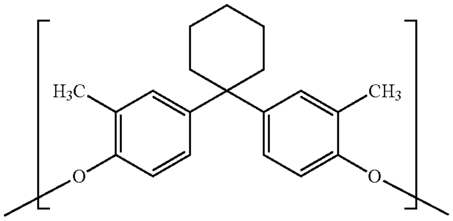

Hereinafter, diol units (B7-1) to (B7-3) are shown as specific examples of the diol unit (B7). The diol unit (B7) is not limited thereto.

(B7-1)

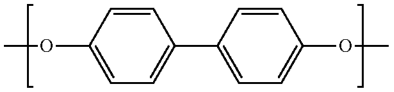

(B7-2)

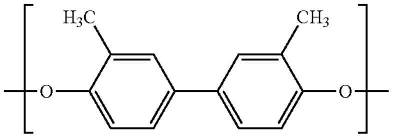

(B7-3)

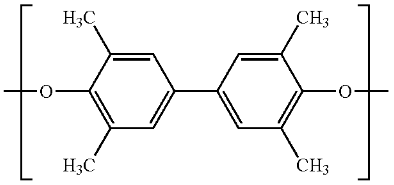

Hereinafter, diol units (B8-1) to (B8-3) are shown as specific examples of the diol unit (B8). The diol unit (B8) is not limited thereto.

(B8-1)

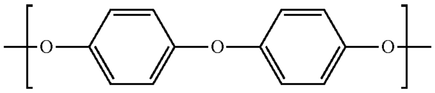

(B8-2)

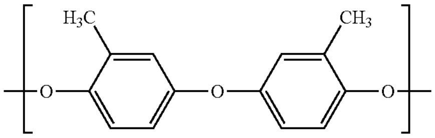

-continued (B8-3)

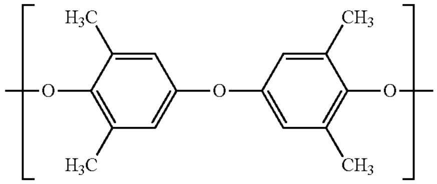

The diol unit (B) contained in the polyester resin (1) may be used alone or in combination of two or more kinds thereof.

The mass proportion of the diol unit (B) in the polyester resin (1) is, for example, preferably 25% by mass or greater and 80% by mass or less.

In a case where the mass proportion of the diol unit (B) is 25% by mass or greater, peeling of the photosensitive layer can be further suppressed. From this viewpoint, the mass proportion of the diol unit (B) is, for example, more preferably 30% by mass or greater and still more preferably 35% by mass or greater.

In a case where the mass proportion of the diol unit (B) is 80% by mass or less, the solubility in a coating solution for forming the photosensitive layer is maintained, and thus the abrasion resistance can be improved. From this viewpoint, the mass proportion of the diol unit (B) is, for example, more preferably 75% by mass or less and still more preferably 70% by mass or less.

Examples of other diol units in addition to the diol unit (B) include aliphatic diol (such as ethylene glycol, diethylene glycol, triethylene glycol, propylene glycol, butanediol, hexanediol, and neopentyl glycol) units and alicyclic diol (such as cyclohexanediol, cyclohexane dimethanol, and hydrogenated bisphenol A) units. These diol units contained in the polyester resin (1) may be used alone or in combination of two or more kinds thereof.

A terminal of the polyester resin (1) may be sealed or modified with a terminal-sealing agent, a molecular weight modifier, or the like used in a case of the production. Examples of the terminal-sealing agent or the molecular weight modifier include monohydric phenol, monovalent acid chloride, monohydric alcohol, and monovalent carboxylic acid.

Examples of the monohydric phenol include phenol, o-cresol, m-cresol, p-cresol, o-ethylphenol, m-ethylphenol, p-ethylphenol, o-propylphenol, m-propylphenol, p-propylphenol, o-tert-butylphenol, m-tert-butylphenol, p-tert-butylphenol, pentylphenol, hexylphenol, octylphenol, nonylphenol, a 2,6-dimethylphenol derivative, a 2-methylphenol derivative, o-phenylphenol, m-phenylphenol, p-phenylphenol, o-methoxyphenol, m-methoxyphenol, p-methoxyphenol, 2,3,5-trimethylphenol, 2,3,6-trimethylphenol, 2,3-xylenol, 2,4-xylenol, 2,5-xylenol, 2,6-xylenol, 3,4-xylenol, 3,5-xylenol, 2-phenyl-2-(4-hydroxyphenyl) propane, 2-phenyl-2-(2-hydroxyphenyl)propane, and 2-phenyl-2-(3-hydroxyphenyl)propane.

Examples of the monovalent acid chloride include monofunctional acid halides such as benzoyl chloride, benzoic acid chloride, methanesulfonyl chloride, phenylchloroformate, acetic acid chloride, butyric acid chloride, octyl acid chloride, benzenesulfonyl chloride, benzenesulfinyl chloride, sulfinyl chloride, benzene phosphonyl chloride, and substituents thereof.

Examples of the monohydric alcohol include methanol, ethanol, n-propanol, isopropanol, n-butanol, 2-butanol, pentanol, hexanol, dodecyl alcohol, stearyl alcohol, benzyl alcohol, and phenethyl alcohol.

Examples of the monovalent carboxylic acid include acetic acid, propionic acid, octanoic acid, cyclohexanecarboxylic acid, benzoic acid, toluic acid, phenylacetic acid, p-tert-butylbenzoic acid, and p-methoxyphenylacetic acid.

The weight-average molecular weight of the polyester resin (1) is, for example, preferably 30,000 or greater and 300,000 or less, more preferably 40,000 or greater and 250,000 or less, and still more preferably 50,000 or greater and 200,000 or less.

The molecular weight of the polyester resin (1) is a molecular weight measured by gel permeation chromatography (GPC) in terms of polystyrene. The GPC is carried out by using tetrahydrofuran as an eluent.

Examples of the method of producing the polyester resin (1) include an interfacial polymerization method, a solution polymerization method, and a melt polymerization method.

Details of the charge transport layer containing the polyester resin (1) and the single layer type photosensitive layer containing the polyester resin (1) will be described below.

Conductive Substrate

Examples of the conductive substrate include metal plates containing metals (such as aluminum, copper, zinc, chromium, nickel, molybdenum, vanadium, indium, gold, and platinum) or alloys (such as stainless steel), metal drums, metal belts, and the like. Further, examples of the conductive substrate include paper, a resin film, a belt, and the like obtained by being coated, vapor-deposited or laminated with a conductive compound (such as a conductive polymer or indium oxide), a metal (such as aluminum, palladium, or gold) or an alloy. Here, the term "conductive" denotes that the volume resistivity is less than $1\times10^{13}$ Ωcm.

In a case where the electrophotographic photoreceptor is used in a laser printer, for example, it is preferable that the surface of the conductive substrate is roughened such that a centerline average roughness Ra thereof is 0.04 μm or greater and 0.5 μm or less for the purpose of suppressing interference fringes from occurring in a case of irradiation with laser beams. In a case where incoherent light is used as a light source, roughening of the surface to prevent interference fringes is not particularly necessary, and it is suitable for longer life because occurrence of defects due to the unevenness of the surface of the conductive substrate is suppressed.

Examples of the roughening method include wet honing performed by suspending an abrasive in water and spraying the suspension to the conductive substrate, centerless grinding performed by pressure-welding the conductive substrate against a rotating grindstone and continuously grinding the conductive substrate, and an anodizing treatment.

Examples of the roughening method also include a method of dispersing conductive or semi-conductive powder in a resin without roughening the surface of the conductive substrate to form a layer on the surface of the conductive substrate, and performing roughening using the particles dispersed in the layer.

The roughening treatment performed by anodization is a treatment of forming an oxide film on the surface of the conductive substrate by carrying out anodization in an electrolytic solution using a conductive substrate made of a metal (for example, aluminum) as an anode. Examples of the electrolytic solution include a sulfuric acid solution and an oxalic acid solution. However, a porous anodized film formed by anodization is chemically active in a natural state, is easily contaminated, and has a large resistance fluctuation depending on the environment. Therefore, for example, it is preferable that a sealing treatment is performed on the porous anodized film so that the fine pores of the oxide film are closed by volume expansion due to a hydration reaction in pressurized steam or boiling water (a metal salt such as nickel may be added thereto) for a change into a more stable a hydrous oxide.

The film thickness of the anodized film is, for example, preferably 0.3 μm or greater and 15 μm or less. In a case where the film thickness is in the above-described range, the barrier properties against injection tend to be exhibited, and an increase in the residual potential due to repeated use tends to be suppressed.

The conductive substrate may be subjected to a treatment with an acidic treatment liquid or a boehmite treatment.

The treatment with an acidic treatment liquid is carried out, for example, as follows. First, an acidic treatment liquid containing phosphoric acid, chromic acid, and hydrofluoric acid is prepared. In the blending ratio of phosphoric acid, chromic acid, and hydrofluoric acid to the acidic treatment liquid, for example, the concentration of the phosphoric acid is 10% by mass or greater and 11% by mass or less, the concentration of the chromic acid is 3% by mass or greater and 5% by mass or less, and the concentration of the hydrofluoric acid is 0.5% by mass or greater and 2% by mass or less, and the concentration of all these acids may be 13.5% by mass or greater and 18% by mass or less. The treatment temperature is, for example, preferably 42° C. or higher and 48° C. or lower. The film thickness of the coating film is, for example, preferably 0.3 μm or greater and 15 μm or less.

The boehmite treatment is carried out, for example, by immersing the conductive substrate in pure water at 90° C. or higher and 100° C. or lower for 5 minutes to 60 minutes or by bringing the conductive substrate into contact with heated steam at 90° C. or higher and 120° C. or lower for 5 minutes to 60 minutes. The film thickness of the coating film is, for example, preferably 0.1 μm or greater and 5 μm or less. This coating film may be further subjected to the anodizing treatment using an electrolytic solution having low film solubility, such as adipic acid, boric acid, a borate, a phosphate, a phthalate, a maleate, a benzoate, a tartrate, or a citrate.

Undercoat Layer

The undercoat layer is, for example, a layer containing inorganic particles and a binder resin.

Examples of the inorganic particles include inorganic particles having a powder resistance (volume resistivity) of $1\times10^{2}$ Ωcm or greater and $1\times10^{11}$ Ωcm or less.

Among these, as the inorganic particles having the above-described resistance value, for example, metal oxide particles such as tin oxide particles, titanium oxide particles, zinc oxide particles, and zirconium oxide particles may be used, and zinc oxide particles are particularly preferable.

The specific surface area of the inorganic particles measured by the BET method may be, for example, 10 $m^2/g$ or greater.

The volume average particle diameter of the inorganic particles may be, for example, 50 nm or greater and 2,000 nm or less (for example, preferably 60 nm or greater and 1,000 nm or less).

The content of the inorganic particles is, for example, preferably 10% by mass or greater and 80% by mass or less and more preferably 40% by mass or greater and 80% by mass or less with respect to the amount of the binder resin.

The inorganic particles may be subjected to a surface treatment. As the inorganic particles, inorganic particles subjected to different surface treatments or inorganic particles having different particle diameters may be used in the form of a mixture of two or more kinds thereof.

Examples of the surface treatment agent include a silane coupling agent, a titanate-based coupling agent, an aluminum-based coupling agent, and a surfactant. In particular, for example, a silane coupling agent is preferable, and a silane coupling agent containing an amino group is more preferable.

Examples of the silane coupling agent containing an amino group include 3-aminopropyltriethoxysilane, N-2-(aminoethyl)-3-aminopropyltrimethoxysilane, N-2-(aminoethyl)-3-aminopropylmethyldimethoxysilane, and N,N-bis(2-hydroxyethyl)-3-aminopropyltriethoxysilane, but are not limited thereto.

The silane coupling agent may be used in the form of a mixture of two or more kinds thereof. For example, a silane coupling agent containing an amino group and another silane coupling agent may be used in combination. Examples of other silane coupling agents include vinyltrimethoxysilane, 3-methacryloxypropyl-tris(2-methoxyethoxy)silane, 2-(3,4-epoxycyclohexyl)ethyltrimethoxysilane, 3-glycidoxypropyltrimethoxysilane, vinyltriacetoxysilane, 3-mercaptopropyltrimethoxysilane, 3-aminopropyltriethoxysilane, N-2-(aminoethyl)-3-aminopropyltrimethoxysilane, N-2-(aminoethyl)-3-aminopropylmethyldimethoxysilane, N,N-bis(2-hydroxyethyl)-3-aminopropyltriethoxysilane, and 3-chloropropyltrimethoxysilane, but are not limited thereto.

The surface treatment method using a surface treatment agent may be any method as long as the method is a known method, and any of a dry method or a wet method may be used.

The treatment amount of the surface treatment agent is, for example, preferably 0.5% by mass or greater and 10% by mass or less with respect to the amount of the inorganic particles.

The undercoat layer is preferable that contain an electron-accepting compound (acceptor compound) together with the inorganic particles from the viewpoint of enhancing the long-term stability of the electrical properties and the carrier blocking properties, for example.

Examples of the electron-accepting compound include electron-transporting substances, for example, a quinone-based compound such as chloranil or bromanil; a tetracyanoquinodimethane-based compound; a fluorenone compound such as 2,4,7-trinitrofluorenone or 2,4,5,7-tetranitro-9-fluorenone; an oxadiazole-based compound such as 2-(4-biphenyl)-5-(4-t-butylphenyl)-1,3,4-oxadiazole, 2,5-bis(4-naphthyl)-1,3,4-oxadiazole, or 2,5-bis(4-diethylaminophenyl)-1,3,4-oxadiazole; a xanthone-based compound; a thiophenone compound; and a diphenoquinone compound such as 3,3',5,5'-tetra-t-butyldiphenoquinone.

In particular, as the electron-accepting compound, for example, a compound having an anthraquinone structure is preferable. As the compound having an anthraquinone structure, for example, a hydroxyanthraquinone compound, an aminoanthraquinone compound, or an aminohydroxyanthraquinone compound is preferable, and specifically, for example, anthraquinone, alizarin, quinizarin, anthrarufin, or purpurin is preferable.

The electron-accepting compound may be contained in the undercoat layer in a state of being dispersed with inorganic particles or in a state of being attached to the surface of each inorganic particle.

Examples of the method of attaching the electron-accepting compound to the surface of the inorganic particle include a dry method and a wet method.

The dry method is, for example, a method of attaching the electron-accepting compound to the surface of each inorganic particle by adding the electron-accepting compound dropwise to inorganic particles directly or by dissolving the electron-accepting compound in an organic solvent while stirring the inorganic particles with a mixer having a large shearing force and spraying the mixture together with dry air or nitrogen gas. The electron-accepting compound may be added dropwise or sprayed, for example, at a temperature lower than or equal to the boiling point of the solvent. After the dropwise addition or the spraying of the electron-accepting compound, the compound may be further baked at 100° C. or higher. The baking is not particularly limited as long as the temperature and the time are adjusted such that the electrophotographic characteristics can be obtained.

The wet method is, for example, a method of attaching the electron-accepting compound to the surface of each inorganic particle by adding the electron-accepting compound to inorganic particles while dispersing the inorganic particles in a solvent using a stirrer, ultrasonic waves, a sand mill, an attritor, or a ball mill, stirring or dispersing the mixture, and removing the solvent. The solvent removing method is carried out by, for example, filtration or distillation so that the solvent is distilled off. After removal of the solvent, the mixture may be further baked at 100° C. or higher. The baking is not particularly limited as long as the temperature and the time are adjusted such that the electrophotographic characteristics can be obtained. In the wet method, the moisture contained in the inorganic particles may be removed before the electron-accepting compound is added, and examples thereof include a method of removing the moisture while stirring and heating the moisture in a solvent and a method of removing the moisture by azeotropically boiling the moisture with a solvent.

The electron-accepting compound may be attached to the surface before or after the inorganic particles are subjected to a surface treatment with a surface treatment agent or simultaneously with the surface treatment performed on the inorganic particles with a surface treatment agent.

The content of the electron-accepting compound may be, for example, 0.01% by mass or greater and 20% by mass or less and preferably 0.01% by mass or greater and 10% by mass or less with respect to the amount of the inorganic particles.

Examples of the binder resin used for the undercoat layer include known polymer compounds such as an acetal resin (such as polyvinyl butyral), a polyvinyl alcohol resin, a polyvinyl acetal resin, a casein resin, a polyamide resin, a cellulose resin, gelatin, a polyurethane resin, a polyester resin, an unsaturated polyester resin, a methacrylic resin, an acrylic resin, a polyvinyl chloride resin, a polyvinyl acetate resin, a vinyl chloride-vinyl acetate-maleic anhydride resin, a silicone resin, a silicone-alkyd resin, a urea resin, a phenol resin, a phenol-formaldehyde resin, a melamine resin, a urethane resin, an alkyd resin, and an epoxy resin, a zirconium chelate compound, a titanium chelate compound, an aluminum chelate compound, a titanium alkoxide compound, an organic titanium compound, and known materials such as a silane coupling agent.

Examples of the binder resin used for the undercoat layer include a charge-transporting resin containing a charge-transporting group, and a conductive resin (such as polyaniline).

Among these, as the binder resin used for the undercoat layer, for example, a resin insoluble in a coating solvent of the upper layer is preferable, and a resin obtained by reaction between a curing agent and at least one resin selected from the group consisting of a thermosetting resin such as a urea resin, a phenol resin, a phenol-formaldehyde resin, a melamine resin, a urethane resin, an unsaturated polyester resin, an alkyd resin, or an epoxy resin; a polyamide resin, a polyester resin, a polyether resin, a methacrylic resin, an acrylic resin, a polyvinyl alcohol resin, and a polyvinyl acetal resin is particularly preferable.

In a case where these binder resins are used in combination of two or more kinds thereof, the mixing ratio thereof is set as necessary.

The undercoat layer may contain various additives for improving the electrical properties, the environmental stability, and the image quality.

Examples of the additives include known materials, for example, an electron-transporting pigment such as a polycyclic condensed pigment or an azo-based pigment, a zirconium chelate compound, a titanium chelate compound, an aluminum chelate compound, a titanium alkoxide compound, an organic titanium compound, and a silane coupling agent. The silane coupling agent is used for a surface treatment of the inorganic particles as described above, but may be further added to the undercoat layer as an additive.

Examples of the silane coupling agent serving as an additive include vinyltrimethoxysilane, 3-methacryloxypropyl-tris(2-methoxyethoxy)silane, 2-(3,4-epoxycyclohexyl) ethyltrimethoxysilane, 3-glycidoxypropyltrimethoxysilane, vinyltriacetoxysilane, 3-mercaptopropyltrimethoxysilane, 3-aminopropyltriethoxysilane, N-2-(aminoethyl)-3-aminopropyltrimethoxysilane, N-2-(aminoethyl)-3-aminopropylmethyldimethoxysilane, N,N-bis(2-hydroxyethyl)-3-aminopropyltriethoxysilane, and 3-chloropropyltrimethoxysilane.

Examples of the zirconium chelate compound include zirconium butoxide, ethyl zirconium acetoacetate, zirconium triethanolamine, acetylacetonate zirconium butoxide, ethyl zirconium butoxide acetoacetate, zirconium acetate, zirconium oxalate, zirconium lactate, zirconium phosphonate, zirconium octanoate, zirconium naphthenate, zirconium laurate, zirconium stearate, zirconium isostearate, zirconium butoxide methacrylate, stearate zirconium butoxide, and isostearate zirconium butoxide.

Examples of the titanium chelate compound include tetraisopropyl titanate, tetranormal butyl titanate, a butyl titanate dimer, tetra(2-ethylhexyl) titanate, titanium acetylacetonate, polytitanium acetylacetonate, titanium octylene glycolate, titanium lactate ammonium salt, titanium lactate, titanium lactate ethyl ester, titanium triethanol aminate, and polyhydroxy titanium stearate.

Examples of the aluminum chelate compound include aluminum isopropylate, monobutoxyaluminum diisopropylate, aluminum butyrate, diethylacetoacetate aluminum diisopropylate, and aluminum tris(ethylacetoacetate).

These additives may be used alone or in the form of a mixture or a polycondensate of a plurality of compounds.

The undercoat layer may have, for example, a Vickers hardness of 35 or greater.

The surface roughness (ten-point average roughness) of the undercoat layer may be adjusted, for example, to ½ from 1/(4n) (n represents a refractive index of an upper layer) of a laser wavelength λ for exposure to be used to suppress moire fringes.

Resin particles or the like may be added to the undercoat layer to adjust the surface roughness. Examples of the resin particles include silicone resin particles and crosslinked polymethyl methacrylate resin particles. Further, the surface of the undercoat layer may be polished to adjust the surface roughness. Examples of the polishing method include buff polishing, a sandblast treatment, wet honing, and a grinding treatment.

The formation of the undercoat layer is not particularly limited, and a known forming method is used. For example, a coating film of a coating solution for forming an undercoat layer in which the above-described components are added to a solvent is formed, and the coating film is dried and, as necessary, heated.

Examples of the solvent for preparing the coating solution for forming an undercoat layer include known organic solvents such as an alcohol-based solvent, an aromatic hydrocarbon solvent, a halogenated hydrocarbon solvent, a ketone-based solvent, a ketone alcohol-based solvent, an ether-based solvent, and an ester-based solvent.

Specific examples of these solvents include typical organic solvents such as methanol, ethanol, n-propanol, iso-propanol, n-butanol, benzyl alcohol, methyl cellosolve, ethyl cellosolve, acetone, methyl ethyl ketone, cyclohexanone, methyl acetate, ethyl acetate, n-butyl acetate, dioxane, tetrahydrofuran, methylene chloride, chloroform, chlorobenzene, and toluene.

Examples of the method of dispersing the inorganic particles in a case of preparing the coating solution for forming an undercoat layer include known methods such as a roll mill, a ball mill, a vibration ball mill, an attritor, a sand mill, a colloid mill, and a paint shaker.

Examples of the method of coating the conductive substrate with the coating solution for forming an undercoat layer include typical coating methods such as a blade coating method, a wire bar coating method, a spray coating method, a dip coating method, a bead coating method, an air knife coating method, and a curtain coating method.

The thickness of the undercoat layer is set to, for example, preferably 15 μm or greater and more preferably 20 μm or greater and 50 μm or less.

Interlayer

An interlayer may be further provided between the undercoat layer and the photosensitive layer.

The interlayer is, for example, a layer containing a resin. Examples of the resin used for the interlayer include a polymer compound, for example, an acetal resin (such as polyvinyl butyral), a polyvinyl alcohol resin, a polyvinyl acetal resin, a casein resin, a polyamide resin, a cellulose resin, gelatin, a polyurethane resin, a polyester resin, a methacrylic resin, an acrylic resin, a polyvinyl chloride resin, a polyvinyl acetate resin, a vinyl chloride-vinyl acetate-maleic anhydride resin, a silicone resin, a silicone-alkyd resin, a phenol-formaldehyde resin, or a melamine resin.

The interlayer may be a layer containing an organometallic compound. Examples of the organometallic compound used for the interlayer include an organometallic compound containing metal atoms such as zirconium, titanium, aluminum, manganese, and silicon.

The compounds used for the interlayer may be used alone or in the form of a mixture or a polycondensate of a plurality of compounds.

Among these, it is preferable that the interlayer is, for example, a layer containing an organometallic compound having a zirconium atom or a silicon atom.

The formation of the interlayer is not particularly limited, and a known forming method is used. For example, a coating film of a coating solution for forming an interlayer in which the above-described components are added to a solvent is formed, and the coating film is dried and, as necessary, heated.

Examples of the coating method of forming the interlayer include typical coating methods such as a dip coating method, a push-up coating method, a wire bar coating method, a spray coating method, a blade coating method, a knife coating method, and a curtain coating method.

The thickness of the interlayer is set to be, for example, preferably in a range of 0.1 μm or greater and 3 μm or less. The interlayer may be used as the undercoat layer.

Charge Generation Layer

The charge generation layer is, for example, a layer containing a charge generation material and a binder resin. Further, the charge generation layer may be a deposition layer of the charge generation material. The deposition layer of the charge generation material is preferable in a case where an incoherent light source such as a light emitting diode (LED) or an organic electro-luminesence (EL) image array is used.

Examples of the charge generation material include an azo pigment such as bisazo or trisazo; a fused ring aromatic pigment such as dibromoanthanthrone; a perylene pigment; a pyrrolopyrrole pigment; a phthalocyanine pigment; zinc oxide; and trigonal selenium.

Among these, for example, a metal phthalocyanine pigment or a metal-free phthalocyanine pigment is preferably used as the charge generation material in order to deal with laser exposure in a near infrared region. Specifically, for example, hydroxygallium phthalocyanine, chlorogallium phthalocyanine, dichloro-tin phthalocyanine, and titanyl phthalocyanine are more preferable.

On the other hand, for example, a fused ring aromatic pigment such as dibromoanthanthrone, a thioindigo-based pigment, a porphyrazine compound, zinc oxide, trigonal selenium, or a bisazo pigment is preferable as the charge generation material in order to deal with laser exposure in a near ultraviolet region.

The above-described charge generation material may also be used even in a case where an incoherent light source such as an LED or an organic EL image array having a center wavelength of light emission at 450 nm or greater and 780 nm or less is used, but from the viewpoint of the resolution, the field intensity in the photosensitive layer is increased, and a decrease in charge due to injection of a charge from the substrate, that is, image defects referred to as so-called black spots are likely to occur in a case where a thin film having a thickness of 20 μm or less is used as the photosensitive layer. The above-described tendency is evident in a case where a p-type semiconductor such as trigonal selenium or a phthalocyanine pigment is used as the charge generation material that is likely to generate a dark current.

On the other hand, in a case where an n-type semiconductor such as a fused ring aromatic pigment, a perylene pigment, or an azo pigment is used as the charge generation material, a dark current is unlikely to be generated, and image defects referred to as black spots can be suppressed even in a case where a thin film is used as the photosensitive layer.

The n-type is determined by the polarity of the flowing photocurrent using a typically used time-of-flight method, and a material in which electrons more easily flow as carriers than positive holes is determined as the n-type.

The binder resin used for the charge generation layer is selected from a wide range of insulating resins, and the binder resin may be selected from organic photoconductive polymers such as poly-N-vinylcarbazole, polyvinylanthracene, polyvinylpyrene, and polysilane.

Examples of the binder resin include a polyvinyl butyral resin, a polyarylate resin (a polycondensate of bisphenols and aromatic divalent carboxylic acid), a polycarbonate resin, a polyester resin, a phenoxy resin, a vinyl chloride-vinyl acetate copolymer, a polyamide resin, an acrylic resin, a polyacrylamide resin, a polyvinylpyridine resin, a cellulose resin, a urethane resin, an epoxy resin, casein, a polyvinyl alcohol resin, and a polyvinylpyrrolidone resin. Here, the term "insulating" denotes that the volume resistivity is $1\times10^{13}$ Ωcm or greater.

These binder resins may be used alone or in the form of a mixture of two or more kinds thereof.

The blending ratio between the charge generation material and the binder resin is, for example, preferably in a range of 10:1 to 1:10 in terms of the mass ratio.

The charge generation layer may also contain other known additives.

The formation of the charge generation layer is not particularly limited, and a known forming method is used. For example, a coating film of a coating solution for forming a charge generation layer in which the above-described components are added to a solvent is formed, and the coating film is dried and, as necessary, heated. The charge generation layer may be formed by vapor deposition of the charge generation material. The formation of the charge generation layer by vapor deposition is, for example, particularly suitable in a case where a fused ring aromatic pigment or a perylene pigment is used as the charge generation material.

Examples of the solvent for preparing the coating solution for forming a charge generation layer include methanol, ethanol, n-propanol, n-butanol, benzyl alcohol, methyl cellosolve, ethyl cellosolve, acetone, methyl ethyl ketone, cyclohexanone, methyl acetate, n-butyl acetate, dioxane, tetrahydrofuran, methylene chloride, chloroform, chlorobenzene, and toluene. These solvents are used alone or in the form of a mixture of two or more kinds thereof.

As a method of dispersing particles (for example, the charge generation material) in the coating solution for forming a charge generation layer, for example, a media disperser such as a ball mill, a vibration ball mill, an attritor, a sand mill, or a horizontal sand mill, or a medialess disperser such as a stirrer, an ultrasonic disperser, a roll mill, or a high-pressure homogenizer is used. Examples of the high-pressure homogenizer include a collision type homogenizer in which a dispersion liquid is dispersed by a liquid-liquid collision or a liquid-wall collision in a high-pressure state, and a penetration type homogenizer in which a dispersion liquid is dispersed by penetrating the liquid through a fine flow path in a high-pressure state.

During the dispersion, it is effective to set the average particle diameter of the charge generation material in the coating solution for forming a charge generation layer to 0.5 μm or less, for example, preferably 0.3 μm or less, and more preferably 0.15 μm or less.

Examples of the method of coating the undercoat layer (or the interlayer) with the coating solution for forming a charge generation layer include typical methods such as a blade coating method, a wire bar coating method, a spray coating method, a dip coating method, a bead coating method, an air knife coating method, and a curtain coating method.

The thickness of the charge generation layer is set to, for example, preferably 0.1 μm or greater and 5.0 μm or less and more preferably 0.2 μm or greater and 2.0 μm or less.

Charge Transport Layer

The charge transport layer is, for example, a layer containing a charge transport material and a binder resin. Further, the charge transport layer contains the polyester resin (1) described above as at least a part of the binder resin.

The charge transport layer may be a layer containing a polymer charge transport material.

Examples of the charge transport material include a quinone-based compound such as p-benzoquinone, chloranil, bromanil, or anthraquinone; a tetracyanoquinodimethane-based compound; a fluorenone compound such as 2,4,7-trinitrofluorenone; a xanthone compound; a benzophenone-based compound; a cyanovinyl-based compound; and an electron-transporting compound such as an ethylene-based compound. Examples of the charge transport material include a positive hole-transporting compound such as a triarylamine-based compound, a benzidine-based compound, an arylalkane-based compound, an aryl-substituted ethylene-based compound, a stilbene-based compound, an anthracene-based compound, or a hydrazone-based compound. These charge transport materials may be used alone or in combination of two or more kinds thereof, but are not limited thereto.

From the viewpoint of the charge mobility, for example, a triarylamine derivative represented by Structural Formula (a-1) or a benzidine derivative represented by Structural Formula (a-2) is preferable as the charge transport material.

(a-1)

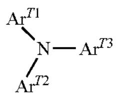

In Structural Formula (a-1), $Ar^{T1}$, $Ar^{T2}$, and $Ar^{T3}$ each independently represent a substituted or unsubstituted aryl group, $—C_6H_4—C(R^{T4})═C(R^{T5})(R^{T6})$, or $—C_6H_4—CH═CH—CH═C(R^{T7})(R^{T8})$. $R^{T4}$, $R^{T5}$, $R^{T6}$, $R^{T7}$, and $R^{T8}$ each independently represent a hydrogen atom, a substituted or unsubstituted alkyl group, or a substituted or unsubstituted aryl group.

Examples of the substituent of each group described above include a halogen atom, an alkyl group having 1 or more and 5 or less carbon atoms, and an alkoxy group having 1 or more and 5 or less carbon atoms. Further, examples of the substituent of each group described above include a substituted amino group substituted with an alkyl group having 1 or more and 3 or less carbon atoms.

(a-2)

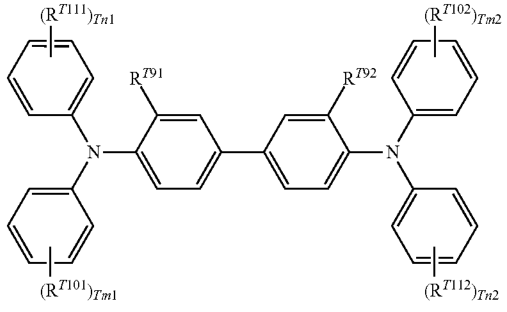

In Structural Formula (a-2), $R^{T91}$ and $R^{T92}$ each independently represent a hydrogen atom, a halogen atom, an alkyl group having 1 or more and 5 or less carbon atoms, or an alkoxy group having 1 or more and 5 or less carbon atoms. $R^{T101}$, $R^{T102}$, $R^{T111}$, and $R^{T112}$ each independently represent a halogen atom, an alkyl group having 1 or more and 5 or less carbon atoms, an alkoxy group having 1 or more and 5 or less carbon atoms, a substituted amino group substituted with an alkyl group having 1 or more and 2 or less carbon atoms, a substituted or unsubstituted aryl group, $—C(R^{T12})═C(R^{T13})(R^{T14})$, or $—CH═CH—CH═C(R^{T15})(R^{T16})$, and $R^{T12}$, $R^{T13}$, $R^{T14}$, $R^{T15}$, and $R^{T16}$ each independently represent a hydrogen atom, a substituted or unsubstituted alkyl group, or a substituted or unsubstituted aryl group. Tm1, Tm2, Tn1, and Tn2 each independently represent an integer of 0 or greater and 2 or less.

Examples of the substituent of each group described above include a halogen atom, an alkyl group having 1 or more and 5 or less carbon atoms, and an alkoxy group having 1 or more and 5 or less carbon atoms. Further, examples of the substituent of each group described above include a substituted amino group substituted with an alkyl group having 1 or more and 3 or less carbon atoms.

Here, among the triarylamine derivative represented by Structural Formula (a-1) and the benzidine derivative represented by Structural Formula (a-2), for example, a triarylamine derivative having "$—C_6H_4—CH═CH—CH═C(R^{T7})(R^{T8})$" and a benzidine derivative having "$—CH═CH—CH═C(R^{T15})(R^{T16})$" are particularly preferable from the viewpoint of the charge mobility.

As the polymer charge transport material, known materials having charge transport properties, such as poly-N-vinylcarbazole and polysilane, can be used. Particularly, for example, a polyester-based polymer charge transport material is particularly preferable. The polymer charge transport material may be used alone or in combination of binder resins.

Examples of the charge transport material or the polymer charge transport material include a polycyclic aromatic compound, a heterocyclic compound, a hydrazone compound, a styryl compound, an enamine compound, a benzidine compound, a triarylamine compound, a diamine compound, an oxadiazole compound, a carbazole compound, an organic polysilane compound, a pyrazoline compound, an indole compound, an oxazole compound, an isoxazole compound, a thiazole compound, a thiadiazole compound, an imidazole compound, a pyrazole compound, a triazole compound, and a resin containing a group derived from any of these substances. Specific examples thereof include compounds described in paragraphs 0078 to 0080 of JP2021-117377A, paragraphs 0046 to 0048 of JP2019-035900A, paragraphs 0052 and 0053 of JP2019-012141A, paragraphs 0122 to 0134 of JP2021-071565A, paragraphs 0101 to 0110 of JP2021-015223A, and paragraph 0116 of JP2013-097300A.

The content of the charge transport material contained in the charge transport layer may be, for example, preferably 28% by mass or greater and 55% by mass or less with respect to the total solid content.

The charge transport layer contains at least the polyester resin (1) as a binder resin. The proportion of the polyester resin (1) in the total amount of the binder resin contained in the charge transport layer is, for example, preferably 50% by mass or greater, more preferably 80% by mass or greater, still more preferably 90% by mass or greater, particularly preferably 95% by mass or greater, and most preferably 100% by mass.

The charge transport layer may contain other binder resins in addition to the polyester resin (1). Examples of other binder resins include a polyester resin other than the polyester resin (1), a polycarbonate resin, a methacrylic resin, an acrylic resin, a polyvinyl chloride resin, a polyvinylidene chloride resin, a polystyrene resin, a polyvinyl acetate resin, a styrene-butadiene copolymer, a vinylidene chloride-acrylonitrile copolymer, a vinyl chloride-vinyl acetate copolymer, a vinyl chloride-vinyl acetate-maleic anhydride copolymer, a silicone resin, a silicone alkyd resin, a phenol-formaldehyde resin, a styrene-alkyd resin, poly-N-vinylcarbazole, and polysilane. These binder resins may be used alone or in combination of two or more kinds thereof.

The charge transport layer may also contain other known additives. Examples of the additives include an antioxidant, a leveling agent, an antifoaming agent, a filler, and a viscosity adjuster.

The formation of the charge transport layer is not particularly limited, and a known forming method is used. For example, a coating film of a coating solution for forming a charge transport layer in which the above-described components are added to a solvent is formed, and the coating film is dried and, as necessary, heated.

Examples of the solvent for preparing the coating solution for forming a charge transport layer include typical organic solvents, for example, aromatic hydrocarbons such as benzene, toluene, xylene, and chlorobenzene; ketones such as acetone and 2-butanone; halogenated aliphatic hydrocarbons such as methylene chloride, chloroform, and ethylene chloride; and cyclic or linear ethers such as tetrahydrofuran and ethyl ether. These solvents are used alone or in the form of a mixture of two or more kinds thereof.

Examples of the coating method of coating the charge generation layer with the coating solution for forming a charge transport layer include typical methods such as a blade coating method, a wire bar coating method, a spray coating method, a dip coating method, a bead coating method, an air knife coating method, and a curtain coating method.

The average thickness of the charge transport layer is, for example, preferably 27 μm or greater and 50 μm or less, more preferably 31 μm or greater and 48 μm or less, and still more preferably 35 μm or greater and 46 μm or less.

Single Layer Type Photosensitive Layer

The single layer type photosensitive layer (charge generation/charge transport layer) is a layer containing a charge generation material, a charge transport material, a binder resin, and as necessary, other additives. Further, the charge transport layer contains the polyester resin (1) described above as at least a part of the binder resin. These materials contained in the single layer type photosensitive layer are the same as the materials described in the sections of the charge generation layer and the charge transport layer.

The single layer type photosensitive layer contains at least the polyester resin (1) as a binder resin. The proportion of the polyester resin (1) in the total amount of the binder resin contained in the single layer type photosensitive layer is, for example, preferably 50% by mass or greater, more preferably 80% by mass or greater, still more preferably 90% by mass or greater, particularly preferably 95% by mass or greater, and most preferably 100% by mass.

The content of the charge generation material in the single layer type photosensitive layer may be, for example, 0.1% by mass or greater and 10% by mass or less and preferably 0.8% by mass or greater and 5% by mass or less with respect to the total solid content.

The content of the charge transport material contained in the single layer type photosensitive layer may be, for example, 40% by mass or greater and 60% by mass or less with respect to the total solid content.

The method of forming the single layer type photosensitive layer is the same as the method of forming the charge generation layer or the charge transport layer.

The average thickness of the single layer type photosensitive layer is, for example, preferably 27 μm or greater and 50 μm or less, more preferably 31 μm or greater and 48 μm or less, and still more preferably 35 μm or greater and 46 μm or less.

Charging Device

The charging device 15 charges the surface of the photoreceptor 12. The charging device 15 is provided, for example, on the surface of the photoreceptor in a contact or non-contact manner and includes a charging member 14 that charges the surface of the photoreceptor 12 and a power supply 28 (an example of a voltage applying unit for the charging member) that applies a charging voltage to the charging member 14. The power supply 28 is electrically connected to the charging member 14.

As the charging member 14 of the charging device 15, for example, a contact type charger formed of a conductive charging roller, a charging brush, a charging film, a charging rubber blade, a charging tube, or the like is used. Further, examples of the charging member 14 include chargers known per se such as a non-contact type roller charger, a scorotron charger using corona discharge, and a corotron charger.

Electrostatic Charge Image Forming Device

The electrostatic charge image forming device 16 forms an electrostatic charge image on the surface of the charged photoreceptor 12. Specifically, for example, the electrostatic charge image forming device 16 irradiates the surface of the photoreceptor 12 charged by the charging member 14 with light L modulated based on image information of an image to be formed so that an electrostatic charge image according to the image of image information is formed on the photoreceptor 12.

Examples of the electrostatic charge image forming device 16 include an optical system device that includes a light source imagewise-exposing the surface of the electrophotographic photoreceptor to light such as a semiconductor laser beam, LED light, or liquid crystal shutter light.

Developing Device

The developing device 18 is provided, for example, on the downstream side of the photoreceptor 12 in a rotation direction with respect to an irradiation position of the light L using the electrostatic charge image forming device 16. An accommodating portion that accommodates a developer is provided in the developing device 18. A developer that contains a toner containing toner particles and an external additive is accommodated in the accommodating portion. The toner is accommodated, for example, in a charged state in the developing device 18.

The developing device 18 includes a developing member 18A that develops the electrostatic charge image formed on the surface of the photoreceptor 12 with the developer which contains a toner containing toner particles and an external additive, and a power supply 32 that applies a developing voltage to the developing member 18A. The developing member 18A is electrically connected to, for example, the power supply 32.

The developing member 18A of the developing device 18 is selected depending on the kind of developer, and examples thereof include a developing roll having a developing sleeve with a built-in magnet.

The developing device 18 (including the power supply 32) is, for example, electrically connected to the control device 36 provided in the image forming apparatus 10, is driven and controlled by the control device 36, and applies a developing voltage to the developing member 18A. The developing member 18A to which the developing voltage has been applied is charged with a developing potential according to the developing voltage. Further, the developing member 18A charged with the developing potential, for example, holds the developer accommodated in the developing device 18 on the surface and supplies the toner contained in the developer to the surface of the photoreceptor 12 from the inside of the developing device 18. The formed electrostatic charge image is developed as a toner image on the surface of the photoreceptor 12 to which the toner has been supplied.

Transfer Device

The transfer device 31 is provided, for example, on the downstream side of the photoreceptor 12 in the rotation direction with respect to the position where the developing member 18A is disposed. The transfer device 31 includes, for example, a transfer member 20 that transfers a toner image formed on the surface of the photoreceptor 12 to a recording medium 30A and a power supply 30 that applies a transfer voltage to the transfer member 20. The transfer member 20 has, for example, a columnar shape and transports the recording medium 30A in a state of sandwiching the recording medium 30A between the photoreceptor 12 and the transfer member 20. The transfer member 20 is, for example, electrically connected to the power supply 30.

Examples of the transfer member 20 include a contact type transfer charger formed of a belt, a roller, a film, or a rubber cleaning blade and a non-contact type transfer charger known per se such as a scorotron transfer charger using corona discharge or a corotron transfer charger.

The transfer device 31 (including the power supply 30) is, for example, electrically connected to the control device 36 provided in the image forming apparatus 10, is driven and controlled by the control device 36, and applies a transfer voltage to the transfer member 20. The transfer member 20 to which the transfer voltage has been applied is charged with a transfer potential according to the transfer voltage.

In a case where a transfer voltage having a polarity opposite to the polarity of the toner constituting the toner image formed on the photoreceptor 12 is applied to the transfer member 20 from the power supply 30 of the transfer member 20, a transfer electric field with an electric field intensity for moving each toner constituting the toner image on the photoreceptor 12 to the transfer member 20 side from the photoreceptor 12 using an electrostatic force is formed, for example, in a region where the photoreceptor 12 and the transfer member 20 face each other (see a transfer region 32A in FIG. 2).

The recording medium 30A is, for example, accommodated in an accommodating portion (not shown), is transported from the accommodating portion along a transport path 34 by a plurality of transporting members (not shown), and reaches the transfer region 32A, which is the region where the photoreceptor 12 and the transfer member 20 face each other. In the example shown in FIG. 2, the recording medium 30A is transported in a direction indicated by an arrow AR2. In the recording medium 30A that has reached the transfer region 32A, for example, the toner image on the photoreceptor 12 is transferred by the transfer electric field formed in the region by application of the transfer voltage to the transfer member 20. That is, for example, the toner image is transferred onto the recording medium 30A by the movement of the toner from the surface of the photoreceptor 12 to the recording medium 30A. Further, the toner image on the photoreceptor 12 is transferred onto the recording medium 30A by the transfer electric field.

Cleaning Device

The cleaning device 22 includes a cleaning blade 22A that comes into contact with the surface of the photoreceptor 12 and cleans the surface of the photoreceptor 12.

The cleaning device 22 is provided on the downstream side of the photoreceptor 12 in the rotation direction with respect to the transfer region 32A. The cleaning device 22 cleans the residual toner particles adhered to the photoreceptor 12 after the toner image is transferred to the recording medium 30A. The cleaning device 22 cleans an adhesive material such as paper dust in addition to the residual toner particles.

The cleaning device 22 includes the cleaning blade 22A and brings the tip of the cleaning blade 22A into contact with the photoreceptor 12 in a direction facing the rotation direction to remove the adhesive material (including residual toner particles) on the surface of the photoreceptor 12.

Here, the cleaning device 22 will be described with reference to FIG. 5.

Figure 5:
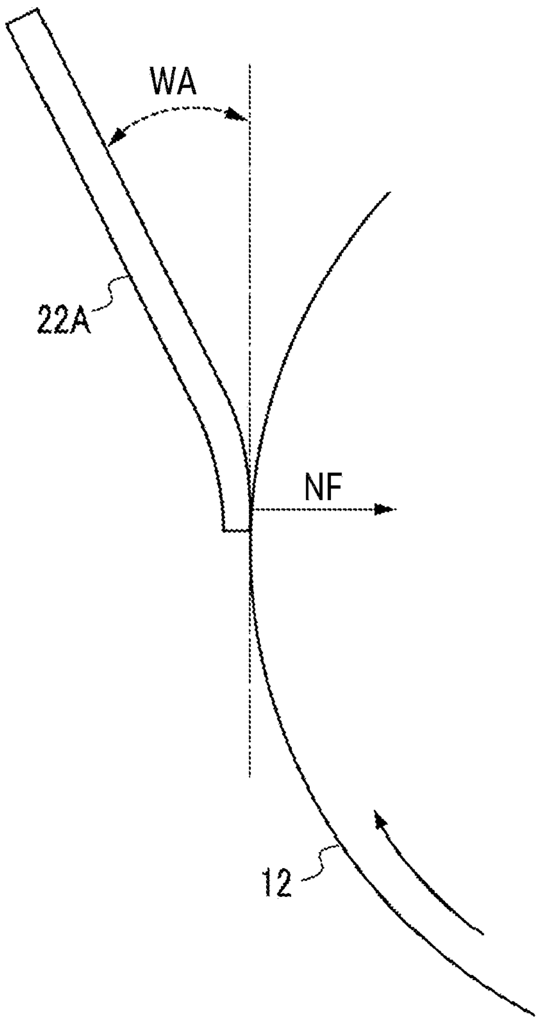
FIG. 5 is a schematic configuration view showing an installation mode of a cleaning blade 22A in a cleaning device 22 shown in FIG. 2.

FIG. 5 is a schematic configuration view showing an installation mode of the cleaning blade 22A in the cleaning device 22 shown in FIG. 2.

As shown in FIG. 5, the tip of the cleaning blade 22A is directed to a direction facing the rotation direction (arrow direction) of the photoreceptor 12 and is in contact with the surface of the photoreceptor 12 in this state.

In a case where the cleaning blade 22A comes into contact with the surface of the photoreceptor 12, for example, it is preferable that the following conditions are satisfied. The angle θ is easily adjusted to 35° or greater and 50° or less by satisfying the following conditions.

A contact angle WA (working angle) of the cleaning blade 22A with respect to the photoreceptor 12, that is, the angle between a tangent line (one dot chain line in FIG. 5) at a contact portion between the tip of the cleaning blade 22A and the photoreceptor 12 and a non-deformed portion of the cleaning blade 22A is, for example, preferably 10° or greater and 12.5° or less and more preferably 10.5° or greater and 12° or less.

Further, the pressing force NF (normal force) of the cleaning blade 22A against the photoreceptor 12 is, for example, preferably 2.0 gf/mm or greater and 3.0 gf/mm or less and more preferably 2.6 gf/mm or greater and 3.0 gf/mm or less.

Further, the amount of the cleaning blade 22A biting into the photoreceptor 12 is, for example, preferably 1.0 mm or greater and 1.5 mm or less and more preferably 1.2 mm or greater and 1.5 mm or less.

The cleaning blade 22A is formed such that a support member (not shown in FIG. 5) is bonded to a surface side opposite to the surface in contact with the photoreceptor 12 and the cleaning blade is supported by this support member. The cleaning blade 22A is pressed against the photoreceptor 12 by the support member due to the pressing pressure. Examples of the support member include metal materials such as aluminum and stainless steel. In addition, an adhesive layer formed of an adhesive or the like for adhesion between the support member and the cleaning blade 22A may be provided therebetween.

The cleaning device may include known members in addition to the cleaning blade 22A and the support member that supports the cleaning blade 22A.

Preferable Physical Properties

Hereinafter, preferable physical properties of the cleaning blade will be described.

From the viewpoint of easily adjusting the angle θ to be in the above-described ranges and from the viewpoint of suppressing abrasion of the cleaning blade, for example, the surface free energy of the cleaning blade in the contact portion between the cleaning blade and the surface of the photoreceptor is preferably 42.5 mN/m or less. Further, the lower limit of the surface free energy thereof in the contact portion between the cleaning blade and the surface of the photoreceptor is, for example, 39 mN/m or greater and preferably 39.5 mN/m or greater.

The 100% modulus of the cleaning blade in the contact portion between the cleaning blade and the surface of the photoreceptor at 23° C. may be, for example, 15 MPa or greater and 24 MPa or less and is, for example, preferably 17 MPa or greater and 23 MPa or less from the viewpoint of easily adjusting the angle θ to be in the above-described ranges and from the viewpoint of suppressing abrasion of the cleaning blade.

The rebound resilience coefficient of the cleaning blade in the contact portion between the cleaning blade and the surface of the photoreceptor may be, for example, 16% or greater and 28% or less and is, for example, preferably 16% or greater and 24% or less from the viewpoint of easily adjusting the angle θ to be in the above-described ranges and from the viewpoint of suppressing abrasion of the cleaning blade.

Here, the surface free energy is calculated with a program built in a device by a Zisman method using a contact angle meter CAM-200 (manufactured by KSV).

Further, the 100% modulus at 23° C. is measured at a tensile speed of 500 mm/min using a dumbbell-like #3 test piece in an environment of 23° C. in conformity with JIS K 6251 (2010) and acquired by the stress at a 100% strain. Further, Strograph AE Elastomer (manufactured by Toyo Seiki Co., Ltd.) is used as a measuring device.

Further, the rebound resilience coefficient is acquired by using LUPKE rebound resilience tester in an environment of 23° C. in conformity with JIS K 6255 (1996).

The cleaning blade may have, for example, a single-layer configuration, a two-layer configuration, a configuration of three or more layers, or other configurations as long as the contact portion between the cleaning blade and the photoreceptor having the above-described physical properties is provided.

Examples of the cleaning blade having the single-layer configuration include a cleaning blade configured such that the entire cleaning blade including the contact portion with the photoreceptor is formed of a single material (that is, a cleaning blade consisting of a contact member).

Examples of the cleaning blade having the two-layer configuration includes a cleaning blade provided with a first layer including a contact portion with the photoreceptor, formed over the entire surface on a belly side, and consisting of a contact member and a second layer serving as a back surface layer formed on a back surface side of the first layer and consisting of a material different from the material of a contact member.

Examples of the cleaning blade having the configuration of three or more layers include a cleaning blade having other layers between, for example, the first layer and the second layer of the cleaning blade having the two-layer configuration.

The cleaning blade is used, for example, by being bonded to a rigid plate-like support material.

Composition of Contact Member

The composition of the contact member constituting the cleaning blade is not particularly limited, and a composition having the above-described preferable physical properties is preferable.

Examples of the contact member include a member containing a polyurethane rubber.

Polyurethane Rubber

The polyurethane rubber is a polyurethane rubber obtained by polymerizing at least a polyol component and a polyisocyanate component. The polyurethane rubber may be, as necessary, polyurethane rubber obtained by polymerizing a resin containing a functional group capable of reacting with an isocyanate group of a polyisocyanate in addition to the polyol component.

It is preferable that the polyurethane rubber has, for example, a hard segment and a soft segment. The term "hard segment" denotes, among polyurethane rubber materials, a segment in which the material constituting the hard segment is relatively harder than the material constituting the soft segment, and the term "soft segment" denotes a segment in which the material constituting the soft segment is relatively softer than the material constituting the hard segment.

Examples of the material constituting the hard segment (hard segment material) include low-molecular-weight polyol components among polyol components and resins containing a functional group capable of reacting with an isocyanate group of a polyisocyanate. On the other hand, examples of the material constituting the soft segment (soft segment material) include high-molecular-weight polyol components among polyol components.

Here, the average particle diameter of aggregates of the hard segment is, for example, preferably 1 μm or greater and 10 μm or less and more preferably 1 μm or greater and 5 μm or less.

The frictional resistance of the surface of the contact member is likely to be reduced by setting the average particle diameter of aggregates of the hard segment to 1 μm or greater. Therefore, the blade behavior is stabilized, and local abrasion is likely to be suppressed.

Meanwhile, occurrence of chipping is likely to be suppressed by setting the average particle diameter of aggregates of the hard segment to 10 μm or less.

The average particle diameter of aggregates of the hard segment is measured in the following manner. The average particle diameter is obtained by capturing an image at a magnification of ×20 using a polarizing microscope (BX51-P, manufactured by Olympus Corporation), performing image processing to binarize the image, measuring the particle diameters (equivalent circle diameters) of aggregates with respect to 5 points for one cleaning blade (the particle diameters of 5 aggregates for one cleaning blade are measured) and 20 cleaning blades, and calculating the average particle diameter of a total of 500 aggregates.

Further, the binarization of the image is carried out by adjusting the thresholds of the hue, the chroma, and the brightness using image processing software OLYMPUS Stream essentials (manufactured by Olympus Corporation) such that the color of the aggregates of the crystal part and the hard segment is black and the color of the amorphous part (corresponding to the soft segment) is white.

Polyol Component

The polyol component contains a high-molecular-weight polyol and a low-molecular-weight polyol.

The high-molecular-weight polyol component is a polyol having a number average molecular weight of 500 or greater (for example, preferably 500 or greater and 5,000 or less). Examples of the high-molecular-weight polyol component include known polyols such as a polyester polyol obtained by dehydration condensation of a low-molecular-weight polyol and a dibasic acid, a polycarbonate polyol obtained by a reaction between a low-molecular-weight polyol and an alkyl carbonate, a polycaprolactone polyol, and a polyether polyol. Further, examples of commercially available products of the high-molecular-weight polyol include PLACCEL 205 and PLACCEL 240 (manufactured by Daicel Corporation).

Here, the number average molecular weight is a value measured by a gel permeation chromatography (GPC) method. The same applies hereinafter.

These high-molecular-weight polyols may be used alone or in combination of two or more kinds thereof.

The polymerization ratio of the high-molecular-weight polyol component may be, for example, preferably 30% by mole or greater and 50% by mole or less and is preferably 40% by mole or greater and 50% by mole or less with respect to the total polymerization component of the polyurethane rubber.

The low-molecular-weight polyol component is a polyol having a molecular weight (number average molecular weight) of less than 500. The low-molecular-weight polyol is a material that functions as a chain extender and a crosslinking agent.

Examples of the low-molecular-weight polyol component include 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, and 1,20-eicosanediol. Among these, for example, 1,4-butanediol is preferably employed as the low-molecular-weight polyol component.

Examples of the low-molecular-weight polyol component include a diol (bifunctional), a triol (trifunctional), and a tetraol (tetrafunctional), which are known as chain extenders and crosslinking agents.

These polyols may be used alone or in combination of two or more kinds thereof.

The polymerization ratio of the low-molecular-weight polyol component may be, for example, greater than 50% by mole and 75% by mole or less and is preferably 52% by mole or greater and 75% by mole or less, more preferably 55% by mole or greater and 75% by mole or less, and still more preferably 55% by mole or greater and 60% by mole or less with respect to the total polymerization components of the polyurethane rubber.

Further, the proportion of 1,4-butanediol as the low-molecular-weight polyol component is, for example, preferably greater than 50% by mole and 75% by mole or less (for example, more preferably 52% by mole or greater and 75% by mole or less, still more preferably 55% by mole or greater and 75% by mole or less, and even still more preferably 55% by mole or greater and 60% by mole or less) with respect to the total polyol components (high-molecular-weight polyol+low-molecular-weight polyol).

Local abrasion is likely to be suppressed by setting the proportion of 1,4-butanediol to greater than 50% by mole. Further, occurrence of chipping is likely to be suppressed by setting the proportion of 1,4-butanediol to 75% by mole or less.

Further, the proportion of 1,4-butanediol in the total low-molecular-weight polyol components is 80% by mole or greater, for example, preferably 90% by mole or greater, and more preferably 100% by mole. That is, it is most preferable to use 1,4-butanediol as the low-molecular-weight polyol component.

Polyisocyanate Component

Examples of the polyisocyanate component include 4,4'-diphenylmethane diisocyanate (MDI), 2,6-toluene diisocyanate (TDI), 1,6-hexane diisocyanate (HDI), 1,5-naphthalene diisocyanate (NDI), and 3,3-dimethylbiphenyl-4,4'-diisocyanate (TODI).

As the polyisocyanate component, for example, 4,4'-diphenylmethane diisocyanate (MDI), 1,5-naphthalene diisocyanate (NDI), or hexamethylene diisocyanate (HDI) is more desirable.

These polyisocyanate components may be used alone or in combination of two or more kinds thereof.

The polymerization ratio of the polyisocyanate component may be, for example, 5% by mole or greater and 25% by mole or less and is preferably 10% by mole or greater and 20% by mole or less with respect to the total polymerization component of the polyurethane rubber.

Resin Containing Functional Group Capable of Reacting with Isocyanate Group

As the resin containing a functional group capable of reacting with an isocyanate group (hereinafter, referred to as "functional group-containing resin"), for example, a resin having flexibility is desirable, and an aliphatic resin having a linear structure is more desirable from the viewpoint of flexibility. Specific examples of the functional group-containing resin include an acrylic resin containing two or more hydroxyl groups, a polybutadiene resin containing two or more hydroxyl groups, and an epoxy resin containing two or more epoxy groups.

Examples of commercially available products of the acrylic resin containing two or more hydroxyl groups include ACTFLOW (grades: UMB-2005B, UMB-2005P, UMB-2005, UME-2005, and the like, manufactured by Soken Chemical & Engineering Co., Ltd.).

Examples of commercially available products of the polybutadiene resin containing two or more hydroxyl groups include R-45HT (manufactured by Idemitsu Kosan Co., Ltd.).

As the epoxy resin containing two or more epoxy groups, for example, not a resin having a property of being hard and brittle such as a typical epoxy resin of the related art, but a resin having flexibility and toughness than the epoxy resin of the related art is desirable. As the epoxy resin, for example, a resin having a structure capable of increasing the mobility of the main chain (flexible skeleton) in the main chain structure thereof is preferable in terms of the molecular structure, and examples of the flexible skeleton include an alkylene skeleton, a cycloalkane skeleton, and a polyoxyalkylene skeleton. Among these, a polyoxyalkylene skeleton is particularly preferable.

Further, for example, an epoxy resin having a low viscosity relative to the molecular weight is preferable to the epoxy resin of the related art in terms of the physical properties. Specifically, for example, the weight-average molecular weight is in a range of 900±100 and the viscosity at 25° C. is desirably in a range of 15,000±5,000 mPa·s and more desirably in a range of 15,000±3,000 mPa·s. Examples of commercially available products of the epoxy resin having the above-described characteristics include EPLICON EXA-4850-150 (manufactured by DIC Corporation).

The polymerization ratio of the functional group-containing resin may be, for example, set to be in a range where the effects of the cleaning blade according to the present exemplary embodiment are not impaired.

Method of Producing Polyurethane Rubber and Method of Molding Contact Member

The polyurethane rubber is produced by using a typical method of producing polyurethane such as a prepolymer method or a one-shot method. The prepolymer method is suitable for the present exemplary embodiment from the viewpoint of obtaining polyurethane having excellent abrasion resistance and excellent chipping resistance, but the production method is not limited thereto.

Further, the contact member (or the cleaning blade having a single-layer structure) is molded by forming a composition for forming a cleaning blade containing a prepolymer of polyurethane rubber or the like into a sheet shape using, for example, centrifugal molding or extrusion molding and performing cutting processing or the like as necessary.

Examples of the catalyst used for producing the polyurethane rubber include an amine-based compound such as a tertiary amine, a quaternary ammonium salt, and an organic metal compound such as an organic tin compound.

Examples of the tertiary amine include trialkylamine such as triethylamine, tetraalkyl diamine such as N,N,N',N'-tetramethyl-1,3-butanediamine, aminoalcohol such as dimethylethanolamine, esteramine such as ethoxylated amine, ethoxylated diamine, or bis(diethylethanolamine)adipate, a cyclohexylamine derivative such as triethylenediamine (TEDA) or N,N-dimethylcyclohexylamine, a morpholine derivative such as N-methylmorpholine or N-(2-hydroxypropyl)-dimethylmorpholine, and a piperazine derivative such as N,N'-diethyl-2-methylpiperazine or N,N'-bis-(2-hydroxypropyl)-2-methylpiperazine.

Examples of the quaternary ammonium salt include 2-hydroxypropyltrimethylammonium octylate, 1,5-diazabicyclo [4.3.0]nonen-5(DBN) octylate, 1,8-diazabicyclo[5.4.0]undec-7(DBU)-octylate, DBU-oleate, DBU-p-toluenesulfonate, DBU-formate, and 2-hydroxypropyltrimethylammonium formate.

Examples of the organic tin compound include a dialkyltin compound such as dibutyltin dilaurate or dibutyltin di(2-ethylhexoate), stannous 2-ethylcaproate, and stannous oleate.

Among these catalysts, triethylenediamine (TEDA) of a tertiary ammonium salt is used in terms of hydrolysis resistance, and a quaternary ammonium salt is used in terms of workability. Among the quaternary ammonium salts, 1,5-diazabicyclo[4.3.0]nonen-5 (DBN) octylate, 1,8-diazabicyclo[5.4.0]undec-7(DBU)-octylate, or DBU-formate with high reaction activity is used.

The content of the catalyst is, for example, preferably in a range of 0.0005% by mass or greater and 0.03% by mass or less and particularly preferably 0.001% by mass or greater and 0.01% by mass or less of the entire polyurethane rubber constituting the contact member.

These may be used alone or in combination of two or more kinds thereof.

Impregnation Treatment with Isocyanate

It is preferable that the contact member is, for example, subjected to an impregnation treatment with an isocyanate.

The impregnation treatment with isocyanate may be carried out by immersing the contact member to be treated in a treatment liquid containing an isocyanate. The isocyanate in the treatment liquid is, for example, cured in a region where the contact member is impregnated with the treatment liquid. The hardness of the treated portion (that is, the region where the contact member is impregnated with the treatment liquid) by the impregnation treatment is increased, and thus the abrasion resistance is increased. In addition, the isocyanate in the treatment liquid may also react with the contact member (specifically, the functional group of the contact member), and in this case, the hardness of the treated portion (that is, the region where the contact member is impregnated with the treatment liquid) by the impregnation treatment is further increased, and thus the abrasion resistance is further increased.

The treatment liquid used for the impregnation treatment contains at least an isocyanate and an organic solvent.

Examples of the isocyanate used in the treatment liquid include diisocyanates such as tolylene diisocyanate (TDI), 4,4'-diphenylmethane diisocyanate (MDI), p-phenylene diisocyanate (PPDI), naphthylene diisocyanate (NDI), and 3,3'-dimethylbiphenyl-4,4'-diyldiisocyanate (TODI), multimers thereof, and modified products thereof.

Further, as the treatment liquid, for example, a mixed solution of an isocyanate, a polyol, and an organic solvent or a mixed solution of an isocyanate group-containing compound containing an isocyanate group at a terminal obtained by reacting an isocyanate with a polyol, that is, an isocyanate group-containing prepolymer and an organic solvent is preferably used.

Further, as the treatment liquid, for example, a mixed solution of a bifunctional isocyanate, a trifunctional polyol, and an organic solvent or a mixed solution of an isocyanate group-containing prepolymer obtained by reacting a bifunctional isocyanate with a trifunctional polyol and an organic solvent is more preferably used.

Here, in a case where the mixed solution of a bifunctional isocyanate, a trifunctional polyol, and an organic solvent is used, the bifunctional isocyanate reacts with the trifunctional polyol to form an isocyanate group-containing prepolymer containing an isocyanate group at the terminal, and the treatment liquid is cured and reacts with the contact member in a case where the contact member is impregnated with the treatment liquid.

In this manner, the treated portion formed by reacting the bifunctional isocyanate with the trifunctional polyol to obtain an isocyanate group-containing prepolymer or using a treatment liquid containing an isocyanate group-containing prepolymer has high hardness even in a case where the thickness thereof is small, and thus the abrasion resistance thereof increases.

Further, the composition of the treatment liquid is appropriately selected in consideration of the wettability to the contact member, the degree of immersion, and the validity period of the treatment liquid.

Examples of the bifunctional isocyanate include 4,4'-diphenylmethane diisocyanate (MDI), p-phenylene diisocyanate (PPDI), isophorone diisocyanate (IPDI), 4,4'-dicyclohexylmethane diisocyanate (H-MDI), trimethylhexamethylene diisocyanate (TMHDI), tolylene diisocyanate (TDI), carbodiimide-modified MDI, polymethylene polyphenyl polyisocyanate (PMDI), 3,3'-dimethylbiphenyl-4,4'-diyldiisocyanate (TODI), naphthylene diisocyanate (NDI), xylene diisocyanate (XDI), lysine diisocyanate methyl ester (LDI), dimethyl diisocyanate, multimers thereof, and modified products thereof.

Among the bifunctional isocyanates, for example, a bifunctional isocyanate having a molecular weight of 200 or greater and 300 or less is preferably used. Examples of such bifunctional isocyanate include 4,4'-diphenylmethane diisocyanate (MDI) and 3,3'-dimethylbiphenyl-4,4'-diyldiisocyanate (TODI).

Examples of the trifunctional polyol include a trifunctional aliphatic polyol such as glycerin, 1,2,4-butanetriol, trimethylolethane (TME), trimethylolpropane (TMP), or 1,2,6-hexanetriol, a polyether triol obtained by adding ethylene oxide, butylene oxide, or the like to a trifunctional aliphatic polyol, and a polyester triol obtained by adding a lactone or the like to a trifunctional aliphatic polyol.

Among the trifunctional polyols, for example, a trifunctional polyol having a molecular weight of 150 or less is preferably used. Examples of such a trifunctional polyol include trimethylolpropane (TMP). The reaction with an isocyanate is rapid and the hardness of the treated portion can be increased by using a trifunctional polyol having a molecular weight of 150 or less. Further, in a case where the treatment liquid contains a trifunctional polyol, a trifunctional hydroxyl group reacts with the isocyanate group to obtain a treated portion having a three-dimensional structure and a high crosslinking density.

The organic solvent used in the treatment liquid is not particularly limited as long as a polyol used as necessary in addition to an isocyanate is dissolved, but a solvent having no active hydrogen that can react with an isocyanate is preferably used. Examples of such an organic solvent include methyl ethyl ketone (MEK), methyl isobutyl ketone (MIBK), tetrahydrofuran (THF), acetone, ethyl acetate, butyl acetate, toluene, and xylene. As the boiling point of the organic solvent decreases, the solubility of the organic solvent increases, the drying after impregnation can be rapidly carried out, and the treatment can be uniformly performed. Further, the organic solvent is appropriately selected depending on the degree of swelling of the contact member, and for example, methyl ethyl ketone (MEK), acetone, or ethyl acetate is preferably used.

Physical Properties of Contact Member

It is preferable that the contact member has, for example, the preferable physical properties of the contact portion with the photoreceptor described above as the physical properties.

That is, the surface free energy of the contact member is, for example, preferably 42.5 mN/m or less and more preferably 40 mN/m or greater and 42.5 mN/m or less.

Further, the 100% modulus of the contact member at 23° C. is, for example, preferably 15 MPa or greater and 24 MPa or less and more preferably 17 MPa or greater and 23 MPa or less.

Further, the rebound resilience coefficient of the contact member is, for example, preferably 16% or greater and 28% or less and more preferably 16% or greater and 24% or less.

The method of controlling the values of the surface free energy, the 100% modulus, and the rebound resilience coefficient in the contact member is not particularly limited, and for example, in a case where the contact member contains polyurethane rubber, a method of adjusting the values to be in the above-described ranges by selecting the kind, the amount, and the conditions for producing each polymerization component of the polyurethane rubber may be employed.

The weight-average molecular weight of the contact member may be, for example, 1,000 or greater and 4,000 or less and preferably 1,500 or greater and 3,500 or less.

The weight-average molecular weight is a value measured by a gel permeation chromatography (GPC) method.

Composition of Non-Contact Member

The composition of a non-contact member in a case where the cleaning blade is formed such that the material of the contact member and the material of a region other than the contact member (hereinafter, also referred to as "non-contact member") are different from each other will be described.

The non-contact member is not particularly limited as long as the non-contact member has a function of supporting the contact member, and any known material can also be used. Specific examples of the material used for the non-contact member include polyurethane rubber, silicon rubber, fluororubber, chloroprene rubber, and butadiene rubber. Among these, for example, polyurethane rubber is preferable. Examples of the polyurethane rubber include ester-based polyurethane and ether-based polyurethane. Among these, for example, ester-based polyurethane is particularly desirable.

Production of Cleaning Blade

The cleaning blade having a single-layer configuration is produced, for example, by the above-described method of molding the contact member.

The cleaning blade having a two-layer configuration and the cleaning blade having a configuration of three or more layers are prepared, for example, by bonding a first layer serving as the contact member and a second layer serving as the non-contact member (a plurality of layers in a case of the layer configuration with three or more layers) to each other. As the bonding method, double-sided tape, various adhesives, or the like is used. Further, a plurality of layers may be bonded to each other by pouring the materials of the respective layers into a mold with a time lag during molding and bonding the materials to each other without providing an adhesive layer.

Destaticizing Device

The destaticizing device 24 is provided, for example, on a downstream side of the photoreceptor 12 in the rotation direction with respect to the cleaning device 22. The destaticizing device 24 exposes the surface of the photoreceptor 12 to destaticize the surface after the toner image is transferred. Specifically, for example, the destaticizing device 24 is electrically connected to the control device 36 provided in the image forming apparatus 10 and is driven and controlled by the control device 36 to expose all surfaces of the photoreceptor 12 (specifically, for example, the entire surface of the image forming area) so that the surfaces are destaticized.

Examples of the destaticizing device 24 include a device having a light supply such as a tungsten lamp that irradiates white light and a device having a light supply such as a light emitting diode (LED) that irradiates red light.

Fixing Device

The fixing device 26 is provided, for example, on a downstream side of the transport path 34 of the recording medium 30A in the transport direction with respect to the transfer region 32A. The fixing device 26 has a fixing member 26A and a pressure member 26B disposed in contact with the fixing member 26A and fixes the toner image transferred onto the recording medium 30A at a contact portion between the fixing member 26A and the pressure member 26B. Specifically, for example, the fixing device 26 is electrically connected to the control device 36 provided in the image forming apparatus 10, is driven and controlled by the control device 36, and fixes the toner image transferred onto the recording medium 30A to the recording medium 30A by heat and a pressure.

Examples of the fixing device 26 include a fixing machine known per se, such as, a thermal roller fixing machine or an oven fixing machine.

Specifically, for example, a known fixing device including a fixing roll or a fixing belt as the fixing member 26A and a pressure roll or a pressure belt as the pressure member 26B is employed as the fixing device 26.

Here, the recording medium 30A transported along the transport path 34 and to which the toner image is transferred by passing through a region (transfer region 32A) where the photoreceptor 12 and the transfer member 20 face each other reaches, for example, the installation position of the fixing device 26 along the transport path 34 by the transport member (not shown) so that the toner image is fixed onto the recording medium 30A.

The recording medium 30A in which the image is formed by fixing the toner image is discharged to the outside of the image forming apparatus 10 by a plurality of transporting members (not shown). Further, the photoreceptor 12 is charged with a charging potential by the charging device 15 again after the destaticization of the destaticizing device 24.

Operation of Image Forming Apparatus

An example of the operation of the image forming apparatus 10 according to the present exemplary embodiment will be described. Further, various operations of the image forming apparatus 10 are performed by a control program executed by the control device 36.

The image forming operation of the image forming apparatus 10 will be described.

First, the surface of the photoreceptor 12 is charged by the charging device 15. The electrostatic charge image forming device 16 exposes the surface of the charged photoreceptor 12 based on the image information. In this manner, an electrostatic charge image according to the image information is formed on the photoreceptor 12. In the developing device 18, the electrostatic charge image formed on the surface of the photoreceptor 12 is developed by a developer containing a toner. In this manner, a toner image is formed on the surface of the photoreceptor 12.

In the transfer device 31, the toner image formed on the surface of the photoreceptor 12 is transferred to the recording medium 30A. The toner image transferred to the recording medium 30A is fixed by the fixing device 26.

On the other hand, the surface of the photoreceptor 12 after the toner image has been transferred is cleaned by the cleaning blade 22A in the cleaning device 22 and then destaticized by the destaticizing device 24.

The configuration of the image forming apparatus described in the present exemplary embodiment is an example, and it goes without saying that the configuration may be changed within a range not departing from the gist of the present exemplary embodiment.

Examples

Hereinafter, exemplary embodiments of the invention will be described in detail based on examples, but the exemplary embodiments of the invention are not limited to the examples. In the following description, "parts" and "%" are on a mass basis unless otherwise specified.

In the following description, the synthesis, the treatment, the production, and the like are carried out at room temperature (25° C.±3° C.) unless otherwise specified.

Preparation of Polyester Resin (1)

Polyester resins (1-1) to (1-9) are prepared. Tables 2 and 3 show units and compositions constituting the polyester resins.

Tables 2 and 3 show "constituent unit:compositional ratio" (for example, A2-3:50) of a dicarboxylic acid unit and a diol unit. The compositional ratio is in units of % by mole of each of the dicarboxylic acid unit and the diol unit.

A2-3 and the like listed in Tables 2 and 3 are specific examples of the dicarboxylic acid unit (A) described above.

B1-4 and the like listed in Tables 2 and 3 are specific examples of the diol unit (B) described above.

In Table 2, (A5), (A6), (A7), and (A8) are respectively a dicarboxylic acid units (A5) represented by Formula (A5), a dicarboxylic acid units (A6) represented by Formula (A6), a dicarboxylic acid units (A7) represented by Formula (A7), and a dicarboxylic acid units (A8) represented by Formula (A8).

Formula (A5)

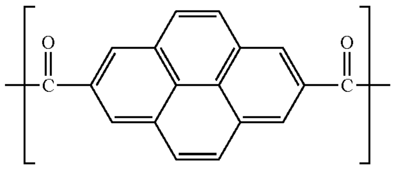

Formula (A6)

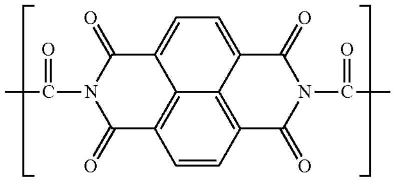

Formula (A7)

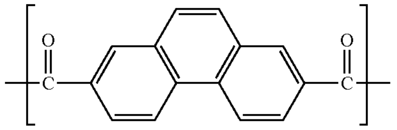

Formula (A8)

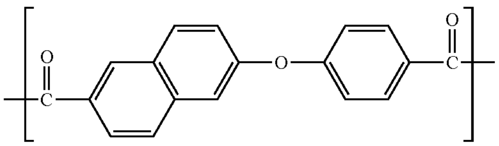

Preparation of Cleaning Blade

Cleaning blades (B1) to (B10) are prepared as follows.

Preparation of Cleaning Blade B1

1,10-decanediol (first polyol component) and 1,4-butanediol (second polyol component) are mixed at a molar ratio of 65/35 and dehydrated and condensed with adipic acid, thereby obtaining a polyester polyol. The polyester polyol is dried under reduced pressure at 75° C. for 15 hours, 59.4 parts of 4,4'-diphenylmethane diisocyanate (MDI, "MILLIONATE MT", manufactured by Tosoh Corporation) with respect to 100 parts of the polyester polyol is added thereto such that the proportion of NC in the prepolymer is set to 7% by mole, and the mixture is allowed to react at 75° C. for 3 hours in a nitrogen atmosphere, thereby obtaining a prepolymer.

Next, the prepolymer is heated to 100° C. and degassed under reduced pressure for 1 hour. Thereafter, 7.14 parts of a mixture of 1,4-butanediol and trimethylolpropane (mass ratio=60/40) is added to 100 parts of the prepolymer, and the mixture is mixed for 3 minutes such that bubbles are not generated, thereby preparing a composition B1 for a cleaning blade. Next, the composition B1 for forming a cleaning blade is poured into a centrifugal molding machine having a mold adjusted to 140° C. and allowed to undergo a curing reaction for 1 hour. Next, the resultant is aged and heated at 110° C. for 24 hours, cooled, and cut, thereby obtaining a cleaning blade B1 having a length of 8 mm and a thickness of 1.9 mm.

Impregnation Treatment with Isocyanate

The obtained cleaning blade B1 is immersed in a 4,4'-diphenylmethane diisocyanate (MDI, "MILLIONATE MT" manufactured by Tosoh Corporation, melting point: 38° C.) bath (80° C.) for 1 minute. The cleaning blade is pulled up from the MDI bath and dried in a room temperature environment for 1 minute. Finally, the surface of the cleaning blade is wiped with a sponge containing a small amount of toluene and dried for another 1 minute.

Preparation of Cleaning Blades B2 to B10

Cleaning blades B2 to B10 are prepared in the same manner as in the preparation of the cleaning blade B1 except that the amount [parts] of the isocyanate used for preparing the cleaning blade B1 is changed to the value listed in Table 1 and the presence or absence of the impregnation treatment with the isocyanate is changed as listed in Table 1.

TABLE 1

| Type of blade | Parts of 4,4'-diphenylmethane diisocyanate ("MILLIONATE MT", manufactured by Tosoh Corporation) | Presence or absence of impregnation treatment with diphenylmethane diisocyanate |
|---|---|---|
| (B1) | 59.4 | Present |
| (B2) | 53.68 | Absent |
| (B3) | 60.72 | Absent |
| (B4) | 59.4 | Absent |
| (B5) | 52.8 | Absent |
| (B6) | 60.28 | Present |
| (B7) | 52.8 | Absent |
| (B8) | 62.04 | Absent |
| (B9) | 48.4 | Absent |
| (B10) | 44 | Absent |

Production of Photoreceptor Including Lamination Type Photosensitive Layer

Photoreceptor (P1)

Formation of Undercoat Layer

An aluminum cylindrical tube having an outer diameter of 30 mm, a length of 250 mm, and a thickness of 1 mm is prepared as a conductive substrate.

100 parts of zinc oxide (average particle diameter of 70 nm, specific surface area of 15 $m^2/g$, manufactured by Tayca Corporation) is stirred and mixed with 500 parts of toluene, 1.3 parts of a silane coupling agent (trade name: KBM603, manufactured by Shin-Etsu Chemical Co., Ltd., N-2-(aminoethyl)-3-aminopropyltrimethoxysilane) is added thereto, and the mixture is stirred for 2 hours. Thereafter, toluene is distilled off under reduced pressure and baked at 120° C. for 3 hours to obtain zinc oxide subjected to a surface treatment with a silane coupling agent.

110 parts of the surface-treated zinc oxide is stirred and mixed with 500 parts of tetrahydrofuran, a solution obtained by dissolving 0.6 part of alizarin in 50 parts of tetrahydrofuran is added thereto, and the mixture is stirred at 50° C. for 5 hours. Thereafter, the solid content is separated by filtration by carrying out filtration under reduced pressure and dried at 60° C. under reduced pressure, thereby obtaining zinc oxide with alizarin.

100 parts of a solution obtained by dissolving 60 parts of the zinc oxide with alizarin, 13.5 parts of a curing agent (blocked isocyanate, trade name: SUMIDUR 3175, manufactured by Sumitomo Bayer Urethane Co., Ltd.), and 15 parts of a butyral resin (trade name: S-LEC BM-1, manufactured by Sekisui Chemical Co., Ltd.) in 68 parts of methyl ethyl ketone is mixed with 5 parts of methyl ethyl ketone, and the solution is dispersed in a sand mill for 2 hours using 1 mmφ glass beads, thereby obtaining a dispersion liquid. 0.005 part of dioctyltin dilaurate as a catalyst and 4 parts of silicone resin particles (trade name: TOSPEARL 145, manufactured by Momentive Performance Materials Inc.) are added to the dispersion liquid, thereby obtaining a coating solution for forming an undercoat layer. The outer peripheral surface of the conductive substrate is coated with the coating solution for forming an undercoat layer by a dip coating method, and dried and cured at 170° C. for 40 minutes to form an undercoat layer with an average thickness of 24 μm.

Formation of Charge Generation Layer

A mixture consisting of 15 parts of hydroxygallium phthalocyanine as a charge generation substance (Bragg angle (2θ±0.2°) of the X-ray diffraction spectrum using Cukα characteristic X-ray has diffraction peaks at positions at least of 7.5°, 9.9°, 12.5, 16.3°, 18.6°, 25.1°, and 28.3°), 10 parts of a vinyl chloride-vinyl acetate copolymer resin (trade name: VMCH, Nippon Unicar Company Limited) as a binder resin, and 200 parts of n-butyl acetate is dispersed in a sand mill for 4 hours using glass beads having a diameter of 1 mm. 175 parts of n-butyl acetate and 180 parts of methyl ethyl ketone are added to the dispersion liquid, and the mixture is stirred, thereby obtaining a coating solution for forming a charge generation layer. The undercoat layer is immersed in and coated with the coating solution for forming a charge generation layer, and dried at room temperature (25° C.±3° C.) to form a charge generation layer having an average thickness of 0.18 μm.

Formation of Charge Transport Layer 60 parts of the polyester resin (1-1) as a binder resin and 40 parts of CTM-1 as a charge transport material are dissolved in 270 parts of tetrahydrofuran and 30 parts of toluene, thereby obtaining a coating solution for forming a charge transport layer. The charge generation layer is immersed in and coated with the coating solution for forming a charge transport layer, and dried at 145° C. for 30 minutes to form a charge transport layer having an average thickness of 24 μm.

CTM-1

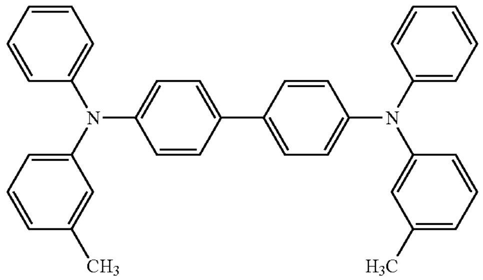

Photoreceptors (P2) to (P15)

Each photoreceptor is prepared in the same manner as in the preparation of the photoreceptor (P1) except that the kind of the polyester resin (1) is changed as listed in Tables 2 and 3 in the formation of the charge transport layer.

Photoreceptor (CP1)

A photoreceptor is prepared in the same manner as in the preparation of the photoreceptor (P1) except that a polycarbonate resin with the following structure (PC-1: weight-average molecular weight of 45,000) is used in plate of the polyester resin (1) in the formation of the charge transport layer.

PC-1

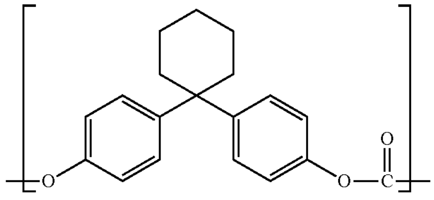

Production of Photoreceptor Including Single Layer Type Photosensitive Layer

Example (P15)

Formation of Undercoat Layer

An aluminum cylindrical tube having an outer diameter of 30 mm, a length of 250 mm, and a thickness of 1 mm is prepared as a conductive substrate.

100 parts of zinc oxide (average particle diameter of 70 nm, specific surface area of 15 $m^2/g$, manufactured by Tayca Corporation) is stirred and mixed with 500 parts of toluene, 1.3 parts of a silane coupling agent (trade name: KBM603, manufactured by Shin-Etsu Chemical Co., Ltd., N-2-(aminoethyl)-3-aminopropyltrimethoxysilane) is added thereto, and the mixture is stirred for 2 hours. Thereafter, toluene is distilled off under reduced pressure and baked at 120° C. for 3 hours to obtain zinc oxide subjected to a surface treatment with a silane coupling agent.

110 parts of the surface-treated zinc oxide is stirred and mixed with 500 parts of tetrahydrofuran, a solution obtained by dissolving 0.6 part of alizarin in 50 parts of tetrahydrofuran is added thereto, and the mixture is stirred at 50° C. for 5 hours. Thereafter, the solid content is separated by filtration by carrying out filtration under reduced pressure and dried at 60° C. under reduced pressure, thereby obtaining zinc oxide with alizarin.

100 parts of a solution obtained by dissolving 60 parts of the zinc oxide with alizarin, 13.5 parts of a curing agent (blocked isocyanate, trade name: SUMIDUR 3175, manufactured by Sumitomo Bayer Urethane Co., Ltd.), and 15 parts of a butyral resin (trade name: S-LEC BM-1, manufactured by Sekisui Chemical Co., Ltd.) in 68 parts of methyl ethyl ketone is mixed with 5 parts of methyl ethyl ketone, and the solution is dispersed in a sand mill for 2 hours using 1 mmφ glass beads, thereby obtaining a dispersion liquid. 0.005 part of dioctyltin dilaurate as a catalyst and 4 parts of silicone resin particles (trade name: TOSPEARL 145, manufactured by Momentive Performance Materials Inc.) are added to the dispersion liquid, thereby obtaining a coating solution for forming an undercoat layer. The outer peripheral surface of the conductive substrate is coated with the coating solution for forming an undercoat layer by a dip coating method, and dried and cured at 170° C. for 40 minutes to form an undercoat layer with an average thickness of 24 μm or less.

Formation of Single Layer Type Photosensitive Layer 45.75 parts of the polyester resin (1-1) as a binder resin, 1.25 parts of V-type hydroxygallium phthalocyanine as a charge generation material (Bragg angle (2θ±0.2°) of the X-ray diffraction spectrum using Cukα characteristic X-ray has diffraction peaks at positions of at least 7.3°, 16.0°, 24.9°, and 28.0°), 9 parts of ETM-1 as an electron transport material, 44 parts of CTM-1 as a charge transport material, and 175 parts of tetrahydrofuran and 75 parts of toluene as solvents are mixed, and the mixture is subjected to a dispersion treatment in a sand mill for 4 hours using glass beads having a diameter of 1 mm, thereby obtaining a coating solution for forming a photosensitive layer. The undercoat layer is immersed in and coated with the coating solution for forming a photosensitive layer and dried and cured at a temperature of 110° C. for 40 minutes, thereby forming a single layer type photosensitive layer having an average thickness of 30 μm or less.

ETM-1

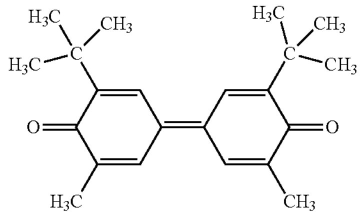

CTM-1

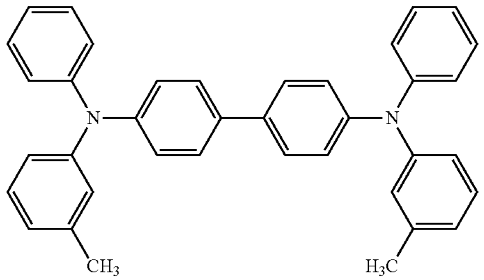

Evaluation

The cleaning blade and the photoreceptor obtained as described above are attached to ApeosPort C-7770 (manufactured by FUJIFILM Business Innovation Corp.) with the combination listed in Tables 2 and 3, thereby obtaining image forming apparatuses of Examples 1 to 22 and Comparative Examples 1 to 5.

External Additive Filming 12,500 sheets of images having an image density of 1% are output on A4 paper using the above-described image forming apparatus in a high-temperature and high-humidity environment (30° C. and 85%). The surface of the photoreceptor after the output is observed with a laser microscope VK-9500 (manufactured by Keyence Corporation), and the external additive filming is evaluated according to the following standards. The evaluation results are listed in Tables 2 and 3.

—Standards—

A: The filming has not occurred.

B: The external additive filming has slightly occurred, which is a level that is sufficiently acceptable for practical use.

C: The filming has occurred, which is a level that is acceptable for practical use.

D: The filming has occurred, which is a level that is unacceptable for practical use.

E: The filming has frequently occurred, which is a level that is unacceptable for practical use.

Abrasion of Photoreceptor 12,500 sheets of images having an image density of 1% are output on A4 paper using the above-described image forming apparatus in a high-temperature and high-humidity environment (30° C. and 85%). The film thicknesses of the photosensitive layer before and after the output of the images are measured with an eddy current type film thickness measuring device and the difference therebetween is calculated as the amount of abrasion, and the amount of abrasion of the photoreceptor due to the output is evaluated according to the following standards. The evaluation results are listed in Tables 2 and 3.

—Standards—

A: Amount of abrasion of photoreceptor<0.6 μm

B: 0.6 μm≤amount of abrasion of photoreceptor≤0.8 μm

C: 0.8 μm<amount of abrasion of photoreceptor≤1.2 μm

D: 1.2 μm<amount of abrasion of photoreceptor≤1.6 μm

E: 1.6 μm<amount of abrasion of photoreceptor

Abrasion of Cleaning Blade 12,500 sheets of images having an image density of 1% are output on A4 paper using the above-described image forming apparatus in a high-temperature and high-humidity environment (30° C. and 85%). A cross-sectional profile is observed with a laser microscope VK-9500 (manufactured by Keyence Corporation), the cross-sectional area of the abraded portion is measured, and the amount of abrasion of the tip of the cleaning blade due to the output is evaluated according to the following standards. The evaluation results are listed in Tables 2 and 3.

—Standards—

A: Amount of abrasion of blade<1.7 $\mu m^2$

B: 1.7 $\mu m^2$≤amount of abrasion of blade≤2.0 $\mu m^2$

C: 2.0 $\mu m^2$<amount of abrasion of blade≤2.3 $\mu m^2$

D: 2.3 $\mu m^2$<amount of abrasion of blade≤3.0 $\mu m^2$

E: 3.0 $\mu m^2$<amount of abrasion of blade

TABLE 2

| | Photoreceptor | | | | | Blade | | | | | | | | | |
|---|---|---|---|---|---|---|---|---|---|---|---|---|---|---|---|
| | | Polyester resin (1) | | | Charge | | Physical properties of contact portion (23° C.) | | | Contact conditions | | | Evaluation | | |
| | Type No. | Resin No. | Dicar-boxylic acid (% by mole) | Diol (% by mole) | trans-port material Type | Type No. | 100% mod-ulus (MPa) | Rebound resilience coefficient (%) | Surface free energy (mN/n) | Pressing force NF (gf/mm) | Contact angle WA (°) | Angle θ (°) | External additive filming | Abrasion of photo-receptor | Abra-sion of blade |
| Example 1 | (P1) | 1-1 | A2-3:50 | B1-4:50 | CTM-1 | (B1) | 21.1 | 20 | 42.2 | 2.2 | 12 | 44.9 | A | A | A |
| Example 2 | (P2) | 1-2 | A2-3:50 | B5-1:50 | CTM-1 | (B1) | 21.1 | 20 | 42.2 | 2.2 | 12 | 44.7 | A | A | A |
| Example 3 | (P3) | 1-3 | A2-3:50 | B1-2:50 | CTM-1 | (B1) | 21.1 | 20 | 42.2 | 2.2 | 12 | 44.7 | A | A | A |
| Example 4 | (P4) | 1-4 | A2-3:50 | B2-6:50 | CTM-1 | (B1) | 21.1 | 20 | 42.2 | 2.2 | 12 | 44.8 | A | A | A |
| Example 5 | (PS) | 1-5 | A3-2:50 | B1-2:50 | CTM-1 | (B1) | 21.1 | 20 | 42.2 | 2.2 | 12 | 44.7 | A | A | A |
| Example 6 | (P6) | 1-6 | A3-2:40<br>A4-3:10 | B6-4:50 | CTM-1 | (B1) | 21.1 | 20 | 42.2 | 2.2 | 12 | 44.9 | A | A | A |
| Example 7 | (P7) | 1-7 | A1-1:25<br>A1-7:25 | B3-3:50 | CTM-1 | (B1) | 21.1 | 20 | 42.2 | 2.2 | 12 | 44.8 | A | A | A |
| Example 8 | (P2) | 1-8 | A3-2:50 | B3-3:40<br>B7-2:10 | CTM-1 | (B1) | 21.1 | 20 | 42.2 | 2.2 | 12 | 44.8 | A | A | A |
| Example 9 | (P9) | 1-9 | A3-2:50 | B4-4:50 | CTM-1 | (B1) | 21.1 | 20 | 42.2 | | 12 | 44.7 | A | A | A |
| Example 10 | (P11) | I-10 | A5:50 | B6-3:50 | CTM-1 | (B1) | 21.1 | 20 | 42.2 | 2.2 | 12 | 39.8 | B | B | B |
| Example 11 | (P12) | I-11 | A6:50 | B1-2:50 | CTM-1 | (B1) | 21.1 | 20 | 43.2 | 2.2 | 12 | 39.5 | B | B | B |
| Example 12 | (P13) | I-12 | A7:50 | B1-2:50 | CTM-1 | (B1) | 21.1 | 30 | 42.2 | 2.2 | 12 | 38.8 | B | B | B |
| Example 13 | (P14) | I-13 | A8:50 | B1-2:50 | CTM-1 | (B1) | 21.1 | 20 | 42.2 | 2.2 | 12 | 38.9 | B | B | B |

TABLE 3

| | Photoreceptor | | | | | Blade | | | | | | | | | |
|---|---|---|---|---|---|---|---|---|---|---|---|---|---|---|---|
| | | | | | | | Physical properties of contact porting (23° C.) | | | Contact conditions | | | Evaluation | | |
| | Polyester resin (1) | | | | Charge | | | | | | | | | | |
| | Type No. | Resin No. | Dicar-boxylic (mol %) | Diol (mol %) | transport material Type | Type No. | 100% mod-ulus (MPa) | Rebound resilience coefficient (%) | Surface free energy (mN/m) | Pressing force NF (gf/mm) | Contact angle WA (°) | An-gle θ (°) | External additive filming | Abra-sion of photo-receptor | Abra-sion of blade |
| Example 14 | (P1) | 1-1 | A2-3:50 | B1-4:50 | CTM-1 | (B2) | 17 | 23 | 42.5 | 2.2 | 12 | 42.1 | B | A | B |
| Example 15 | (P1) | 1-1 | A2-3:50 | B1-4:50 | CTM-1 | (B3) | 24 | 16 | 42.3 | 2.2 | 12 | 45.2 | A | B | A |
| Example 16 | (P1) | 1-1 | A2-3:50 | B1-4:50 | CTM-1 | (B4) | 21.1 | 20 | 43 | 2.2 | 12 | 42.9 | B | A | B |
| Example 17 | (P1) | 1-1 | A2-3:50 | B1-4:50 | CTM-1 | (B5) | 15 | 24 | 42.5 | 2.2 | 12 | 39.9 | C | A | C |
| Example 18 | (P1) | 1-1 | A2-3:50 | B1-4:50 | CTM-1 | (B6) | 23 | 21 | 39 | 2.2 | 12 | 50 | C | A | B |
| Example 19 | (P1) | 1-1 | A2-3:50 | B1-4:50 | CTM-1 | (B7) | 15 | 20 | 42.5 | 2.2 | 12 | 35 | C | A | B |
| Example 20 | (P1) | 1-1 | A2-3:50 | B1-4:50 | CTM-1 | (B7) | 15 | 20 | 42.5 | 2.2 | 10.5 | 39.2 | B | A | C |
| Example 21 | (P1) | 1-1 | A2-3:50 | B1-4:50 | CTM-1 | (B7) | 15 | 20 | 42.5 | 1.8 | 12 | 39 | C | A | B |
| Example 22 | (P15) | 1-1 | A2-3:50 | B1-4:50 | CTM-1/<br>ETM-1 | (B1) | 21.1 | 20 | 42.2 | 2.2 | 12 | 44.7 | A | A | A |
| Comparative Example 1 | (CP1) | | Polycarbonate resin PC-1 | | CTM-1 | (B1) | 21.1 | 20 | 42.2 | 2.2 | 12 | 44.9 | A | D | A |
| Comparative Example 2 | (CP1) | | Polycarbonate resin PC-1 | | CTM-1 | (B2) | 17 | 23 | 42.5 | 2.2 | 12 | 42.1 | B | D | B |

TABLE 3-continued

| | Photoreceptor | | | | | Blade | | | | | | | Evaluation | | |
|---|---|---|---|---|---|---|---|---|---|---|---|---|---|---|---|
| | Polyester resin (1) | | | | Charge transport material | | Physical properties of contact porting (23° C.) | | | Contact conditions | | | | | |
| | Type No. | Resin No. | Dicarboxylic (mol %) | Diol (mol %) | Type | Type No. | 100% modulus (MPa) | Rebound resilience coefficient (%) | Surface free energy (mN/m) | Pressing force NF (gf/mm) | Contact angle WA (°) | Angle θ (°) | External additive filming | Abrasion of photoreceptor | Abrasion of blade |
| Comparative Example 3 | (P1) | 1-1 | A2-3:50 | B1-4:50 | CTM-1 | (B8) | 25 | 21 | 41.1 | 2.2 | 12 | 51 | D | A | D |
| Comparative Example 4 | (P1) | 1-1 | A2-3:50 | B1-4:50 | CTM-1 | (B9) | 8.5 | 16 | 48.6 | 2.2 | 12 | 34 | D | A | D |
| Comparative Example 5 | (P1) | 1-1 | A2-3:50 | B1-4:50 | CTM-1 | (B10) | 6 | 23 | 49.5 | 2.2 | 12 | 29.2 | E | A | E |

As described above, it can be seen that the image forming apparatus of each example can suppress abrasion of the electrophotographic photoreceptor and reduce the external additive filming as compared with the image forming apparatus of each comparative example.

Hereinafter, aspects of the present invention will be described.

(((1)))

An image forming apparatus comprising:

an electrophotographic photoreceptor that has a photosensitive layer constituting a surface of the electrophotographic photoreceptor;

a charging device that charges the surface of the electrophotographic photoreceptor, an electrostatic charge image forming device that forms an electrostatic charge image on the charged surface of the electrophotographic photoreceptor;

a developing device that accommodates a developer containing a toner which contains toner particles and an external additive, and develops the electrostatic charge image formed on the surface of the electrophotographic photoreceptor by the developer as a toner image;

a transfer device that transfers the toner image formed on the surface of the electrophotographic photoreceptor to a surface of a recording medium; and a cleaning device that includes a cleaning blade coming into contact with the surface of the electrophotographic photoreceptor and cleaning at least residual toner particles on the surface of the electrophotographic photoreceptor, wherein the photosensitive layer of the electrophotographic photoreceptor contains a polyester resin (1) having a dicarboxylic acid unit (A) represented by Formula (A) and a diol unit (B) represented by Formula (B), and an angle θ between a tangent line at a contact point between the cleaning blade and the residual toner particles and a tangent line at a contact point between the residual toner particles and the surface of the electrophotographic photoreceptor is 35° or greater and 50° or less.

(((2)))

The image forming apparatus according to (((1))), wherein the angle θ is 40° or greater and 50° or less.

(((3)))

The image forming apparatus according to (((1))) or (((2))), wherein a surface free energy of the cleaning blade in a contact portion with the surface of the electrophotographic photoreceptor is 42.5 mN/m or less.

((((4)))

The image forming apparatus according to any one of (((1))) to (((3))), wherein a 100% modulus of the cleaning blade in a contact portion with the surface of the electrophotographic photoreceptor at 23° C. is 17 MPa or greater and 23 MPa or less.

(((5)))

The image forming apparatus according to (((1))) to (((4))), wherein the angle θ is 400 or greater and 50° or less, and a surface free energy of the cleaning blade in a contact portion with the surface of the electrophotographic photoreceptor is 42.5 mN/m or less.

(((6)))

The image forming apparatus according to any one of (((1))) to (((5))), wherein the angle θ is 400 or greater and 50° or less, and a 100% modulus of the cleaning blade in a contact portion with the surface of the electrophotographic photoreceptor at 23° C. is 17 MPa or greater and 23 MPa or less.

(((7)))

The image forming apparatus according to (((1))) to (((6))), wherein the dicarboxylic acid unit (A) represented by Formula (A) includes at least one selected from the group consisting of a dicarboxylic acid unit (A1) represented by Formula (A1), a dicarboxylic acid unit (A2) represented by Formula (A2), a dicarboxylic acid unit (A3) represented by Formula (A3), and a dicarboxylic acid unit (A4) represented Formula (A4).

(((8)))

The image forming apparatus according to (((5))), wherein the diol unit (B) represented by Formula (B) includes at least one selected from the group consisting of a diol unit (B1) represented by Formula (B1), a diol unit (B2) represented by Formula (B2), a diol unit (B3) represented by Formula (B3), a diol unit (B4) represented by Formula (B4), a diol unit (B5) represented by Formula (B5), a diol unit (B6) represented by Formula (B6), a diol unit (B7) represented by Formula (B7), and a diol unit (B8) represented by Formula (B8).

(((9)))

A process cartridge comprising:

an electrophotographic photoreceptor that has a photosensitive layer constituting a surface of the electrophotographic photoreceptor; and a cleaning device that includes a cleaning blade coming into contact with the surface of the electrophotographic photoreceptor and cleaning at least residual toner particles on the surface of the electrophotographic photoreceptor, wherein the photosensitive layer of the electrophotographic photoreceptor contains a polyester resin (1) having a dicarboxylic acid unit (A) represented by Formula (A) and a diol unit (B) represented by Formula (B), an angle $\theta$ between a tangent line at a contact point between the cleaning blade and the residual toner particles and a tangent line at a contact point between the residual toner particles and the surface of the electrophotographic photoreceptor is 35° or greater and 50° or less, and the process cartridge is attachable to and detachable from an image forming apparatus.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:

an electrophotographic photoreceptor that has a photosensitive layer constituting a surface of the electrophotographic photoreceptor;

a charging device that charges the surface of the electrophotographic photoreceptor;

an electrostatic charge image forming device that forms an electrostatic charge image on the charged surface of the electrophotographic photoreceptor;

a developing device that accommodates a developer containing a toner which contains toner particles and an external additive, and develops the electrostatic charge image formed on the surface of the electrophotographic photoreceptor by the developer as a toner image;

a transfer device that transfers the toner image formed on the surface of the electrophotographic photoreceptor to a surface of a recording medium; and a cleaning device that includes a cleaning blade coming into contact with the surface of the electrophotographic photoreceptor and cleaning at least residual toner particles on the surface of the electrophotographic photoreceptor, wherein the photosensitive layer of the electrophotographic photoreceptor contains a polyester resin (1) having a dicarboxylic acid unit (A) represented by Formula (A) and a diol unit (B) represented by Formula (B), and an angle $\theta$ between a tangent line at a contact point between the cleaning blade and the residual toner particles and a tangent line at a contact point between the residual toner particles and the surface of the electrophotographic photoreceptor is 35° or greater and 50° or less, Formula (A)

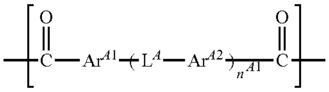

-continued

Formula (B)

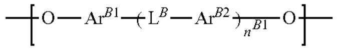

in Formula (A), $Ar^{A1}$ and $Ar^{A2}$ each independently represent an aromatic ring that may have a substituent, $L^A$ represents a single bond or a divalent linking group, and $n^{A1}$ represents 0, 1, or 2, in Formula (B), $Ar^{B1}$ and $Ar^{B2}$ each independently represent an aromatic ring that may have a substituent, $L^B$ represents a single bond, an oxygen atom, a sulfur atom, or —$C(Rb^1)(Rb^2)$—, $n^{B1}$ represents 0, 1, or 2, $Rb^1$ and $Rb^2$ each independently represent a hydrogen atom, an alkyl group having 1 or more and 20 or less carbon atoms, an aryl group having 6 or more and 12 or less carbon atoms, or an aralkyl group having 7 or more and 20 or less carbon atoms, and $Rb^1$ and $Rb^2$ may be bonded to each other to form a cyclic alkyl group.

2. The image forming apparatus according to claim 1, wherein the angle $\theta$ is 40$\theta$ or greater and 50° or less.

3. The image forming apparatus according to claim 1, wherein a surface free energy of the cleaning blade in a contact portion with the surface of the electrophotographic photoreceptor is 42.5 mN/m or less.

4. The image forming apparatus according to claim 1, wherein a 100% modulus of the cleaning blade in a contact portion with the surface of the electrophotographic photoreceptor at 23° C. is 17 MPa or greater and 23 MPa or less.

5. The image forming apparatus according to claim 1, wherein the angle $\theta$ is 40° or greater and 50° or less, and a surface free energy of the cleaning blade in a contact portion with the surface of the electrophotographic photoreceptor is 42.5 mN/m or less.

6. The image forming apparatus according to claim 5, wherein the diol unit (B) represented by Formula (B) includes at least one selected from the group consisting of a diol unit (B1) represented by Formula (B1), a diol unit (B2) represented by Formula (B2), a diol unit (B3) represented by Formula (B3), a diol unit (B4) represented by Formula (B4), a diol unit (B5) represented by Formula (B5), a diol unit (B6) represented by Formula (B6), a diol unit (B7) represented by Formula (B7), and a diol unit (B8) represented by Formula (B8), Formula (B1)

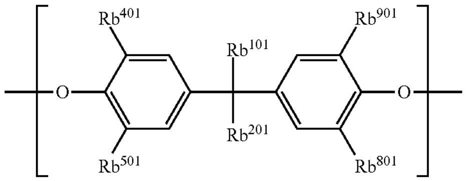

Formula (B2)

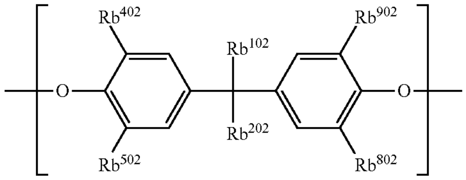

-continued

Formula (B3)

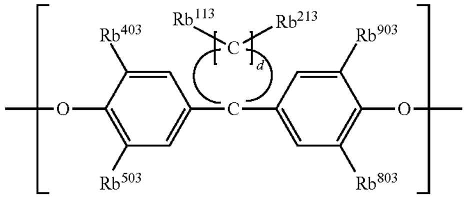

Formula (B4)

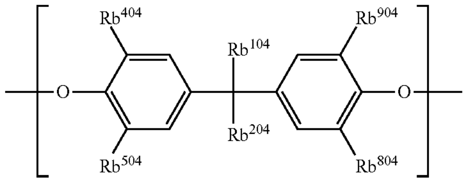

Formula (B5)

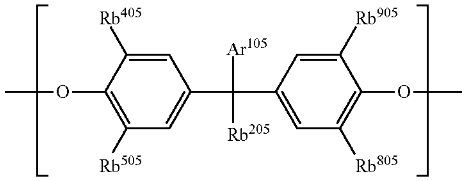

Formula (B6)

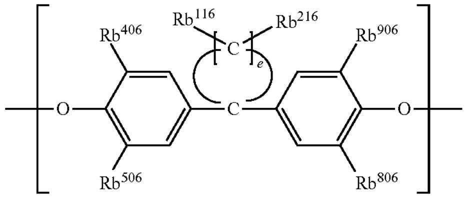

Formula (B7)

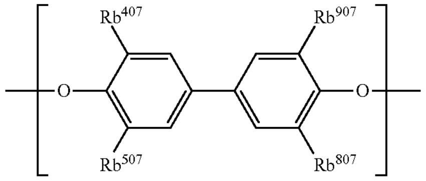

Formula (B8)

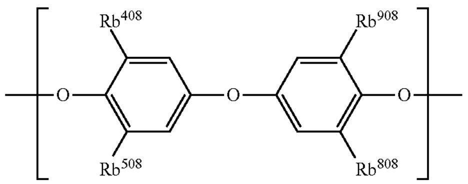

in Formula (B1), $Rb^{100}$ represents a branched alkyl group having 4 or more and 20 or less carbon atoms, $Rb^{201}$ represents a hydrogen atom or an alkyl group having 1 or more and 3 or less carbon atoms, and $Rb^{401}$, $Rb^{501}$, $Rb^{801}$, and $Rb^{901}$ each independently represent a hydrogen atom, an alkyl group having 1 or more and 4 or less carbon atoms, an alkoxy group having 1 or more and 6 or less carbon atoms, or a halogen atom, in Formula (B2), $Rb^{102}$ represents a linear alkyl group having 4 or more and 20 or less carbon atoms, $Rb^{202}$ represents a hydrogen atom or an alkyl group having 1 or more and 3 or less carbon atoms, and $Rb^{402}$, $Rb^{502}$, $Rb^{802}$, and $Rb^{902}$ each independently represent a hydrogen atom, an alkyl group having 1 or more and 4 or less carbon atoms, an alkoxy group having 1 or more and 6 or less carbon atoms, or a halogen atom, in Formula (B3), $Rb^{113}$ and $Rb^{213}$ each independently represent a hydrogen atom, a linear alkyl group having 1 or more and 3 or less carbon atoms, an alkoxy group having 1 or more and 4 or less carbon atoms, or a halogen atom, d represents an integer of 7 or greater and 15 or less, and $Rb^{403}$, $Rb^{503}$, $Rb^{803}$, and $Rb^{903}$ each independently represent a hydrogen atom, an alkyl group having 1 or more and 4 or less carbon atoms, an alkoxy group having 1 or more and 6 or less carbon atoms, or a halogen atom, in Formula (B4), $Rb^{104}$ and $Rb^{204}$ each independently represent a hydrogen atom, an alkyl group having 1 or more and 3 or less carbon atoms, and $Rb^{404}$, $Rb^{504}$, $Rb^{804}$, and $Rb^{904}$ each independently represent a hydrogen atom, an alkyl group having 1 or more and 4 or less carbon atoms, an alkoxy group having 1 or more and 6 or less carbon atoms, or a halogen atom, in Formula (B5), $Ar^{105}$ represents an aryl group having 6 or more and 12 or less carbon atoms or an aralkyl group having 7 or more and 20 or less carbon atoms, $Rb^{205}$ represents a hydrogen atom or an alkyl group having 1 or more and 3 or less carbon atoms, and $Rb^{405}$, $Rb^{505}$, $Rb^{805}$, and $Rb^{905}$ each independently represent a hydrogen atom, an alkyl group having 1 or more and 4 or less carbon atoms, an alkoxy group having 1 or more and 6 or less carbon atoms, or a halogen atom, in Formula (B6), $Rb^{116}$ and $Rb^{216}$ each independently represent a hydrogen atom, a linear alkyl group having 1 or more and 3 or less carbon atoms, an alkoxy group having 1 or more and 4 or less carbon atoms, or a halogen atom, e represents an integer of 4 or greater and 6 or less, and $Rb^{406}$, $Rb^{506}$, $Rb^{806}$, and $Rb^{906}$ each independently represent a hydrogen atom, an alkyl group having 1 or more and 4 or less carbon atoms, an alkoxy group having 1 or more and 6 or less carbon atoms, or a halogen atom, in Formula (B7), $Rb^{407}$, $Rb^{507}$, $Rb^{807}$, and $Rb^{907}$ each independently represent a hydrogen atom, an alkyl group having 1 or more and 4 or less carbon atoms, an alkoxy group having 1 or more and 6 or less carbon atoms, or a halogen atom, in Formula (B8), $Rb^{408}$, $Rb^{508}$, $Rb^{808}$, and $Rb^{908}$ each independently represent a hydrogen atom, an alkyl group having 1 or more and 4 or less carbon atoms, an alkoxy group having 1 or more and 6 or less carbon atoms, or a halogen atom.

7. The image forming apparatus according to claim 1, wherein the angle θ is 40° or greater and 50° or less, and a 100% modulus of the cleaning blade in a contact portion with the surface of the electrophotographic photoreceptor at 23° C. is 17 MPa or greater and 23 MPa or less.

8. The image forming apparatus according to claim 1, wherein the dicarboxylic acid unit (A) represented by Formula (A) includes at least one selected from the group consisting of a dicarboxylic acid unit (A1) represented by Formula (A1), a dicarboxylic acid unit (A2) represented by Formula (A2), a dicarboxylic acid unit (A3) represented by Formula (A3), and a dicarboxylic acid unit (A4) represented Formula (A4), Formula (A1)

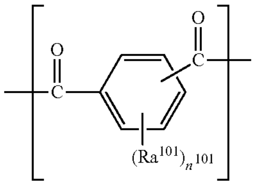

Formula (A2)

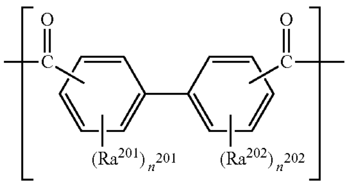

Formula (A3)

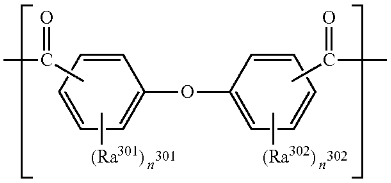

Formula (A4)

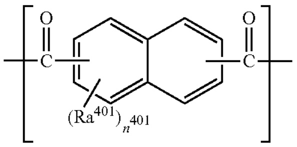

in Formula (A1), $n^{101}$ represents an integer of 0 or greater and 4 or less, and $n^{101}$ number of $Ra^{101}$'s each independently represent an alkyl group having 1 or more and 10 or less carbon atoms, an aryl group having 6 or more and 12 or less carbon atoms, or an alkoxy group having 1 or more and 6 or less carbon atoms, in Formula (A2), $n^{201}$ and $n^{202}$ each independently represent an integer of 0 or greater and 4 or less, and $n^{201}$ number of $Ra^{201}$'s and $n^{202}$ number of $Ra^{202}$'s each independently represent an alkyl group having 1 or more and 10 or less carbon atoms, an aryl group having 6 or more and 12 or less carbon atoms, or an alkoxy group having 1 or more and 6 or less carbon atoms, in Formula (A3), $n^{301}$ and $n^{302}$ each independently represent an integer of 0 or greater and 4 or less, and $n^{301}$ number of $Ra^{301}$'s and $n^{302}$ number of $Ra^{302}$'s each independently represent an alkyl group having 1 or more and 10 or less carbon atoms, an aryl group having 6 or more and 12 or less carbon atoms, or an alkoxy group having 1 or more and 6 or less carbon atoms, in Formula (A4), $n^{401}$ represents an integer of 0 or greater and 6 or less, and $n^{401}$ number of $Ra^{401}$'s each independently represent an alkyl group having 1 or more and 10 or less carbon atoms, an aryl group having 6 or more and 12 or less carbon atoms, or an alkoxy group having 1 or more and 6 or less carbon atoms.

9. A process cartridge comprising:

an electrophotographic photoreceptor that has a photosensitive layer constituting a surface of the electrophotographic photoreceptor; and a cleaning device that includes a cleaning blade coming into contact with the surface of the electrophotographic photoreceptor and cleaning at least residual toner particles on the surface of the electrophotographic photoreceptor, wherein the photosensitive layer of the electrophotographic photoreceptor contains a polyester resin (1) having a dicarboxylic acid unit (A) represented by Formula (A) and a diol unit (B) represented by Formula (B), an angle θ between a tangent line at a contact point between the cleaning blade and the residual toner particles and a tangent line at a contact point between the residual toner particles and the surface of the electrophotographic photoreceptor is 35° or greater and 50° or less, and the process cartridge is attachable to and detachable from an image forming apparatus, Formula (A)

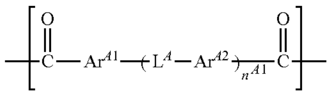

Formula (B)

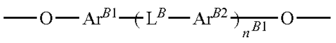

in Formula (A), $Ar^{A1}$ and $Ar^{A2}$ each independently represent an aromatic ring that may have a substituent, $L^{A}$ represents a single bond or a divalent linking group, and $n^{A1}$ represents 0, 1, or 2, in Formula (B), $Ar^{B1}$ and $Ar^{B2}$ each independently represent an aromatic ring that may have a substituent, $L^{B}$ represents a single bond, an oxygen atom, a sulfur atom, or $—C(Rb^1)(Rb^2)—$, $n^{B1}$ represents 0, 1, or 2, $Rb^1$ and $Rb^2$ each independently represent a hydrogen atom, an alkyl group having 1 or more and 20 or less carbon atoms, an aryl group having 6 or more and 12 or less carbon atoms, or an aralkyl group having 7 or more and 20 or less carbon atoms, and $Rb^1$ and $Rb^2$ may be bonded to each other to form a cyclic alkyl group.

* * * * *